US007784680B1

(12) United States Patent
Mason et al.

(10) Patent No.: US 7,784,680 B1
(45) Date of Patent: Aug. 31, 2010

(54) DELAYED ANNUNCIATION OF RECEIPT JAM FOR AUTOMATED BANKING MACHINE

(75) Inventors: Thomas S. Mason, North Canton, OH (US); Bryan K. Reed, Canal Fulton, OH (US); Jeffrey A. Brannan, Massillon, OH (US)

(73) Assignee: Diebold Self-Service Systems, division of Diebold, Incorporated, North Canton, OH (US)

( * ) Notice: Subject to any disclaimer, the term of this patent is extended or adjusted under 35 U.S.C. 154(b) by 2066 days.

(21) Appl. No.: 10/697,956

(22) Filed: Oct. 30, 2003

Related U.S. Application Data

(60) Provisional application No. 60/422,664, filed on Oct. 31, 2002.

(51) Int. Cl.
*G06Q 40/00* (2006.01)

(52) U.S. Cl. ..................... 235/379; 358/1.14; 358/1.15; 399/19; 399/20; 400/76; 400/578; 400/703

(58) Field of Classification Search .................. 235/379
See application file for complete search history.

(56) References Cited

U.S. PATENT DOCUMENTS 4,521,102 A * 6/1985 Motomura et al. ............ 399/19
5,835,816 A * 11/1998 Sawada et al. ................. 399/8
5,850,075 A * 12/1998 Brannan et al. ............. 235/379
2001/0003345 A1* 6/2001 Watari et al. ................ 235/379
2002/0036159 A1* 3/2002 Graef et al. ................. 209/534
2002/0126849 A1* 9/2002 Howard et al. .............. 380/277

FOREIGN PATENT DOCUMENTS

JP 2003157465 A * 5/2003

* cited by examiner

*Primary Examiner*—Steven S Paik
*Assistant Examiner*—Tae Kim
(74) *Attorney, Agent, or Firm*—Ralph E. Jocke; Daniel D. Wasil; Walker & Jocke

(57) ABSTRACT

An automated banking machine (10) determines consecutive receipt jam event indications, involving at least two receipts, prior to generating a receipt jam signal. The machine, upon determining a jam event involving a first receipt, implements a jam annunciation delay routine. The routine delays generation of a receipt jam signal until at least the next receipt is also determined to be involved in a receipt jam event indication. The delay provides the opportunity for a user to clear the indicated receipt jam prior to generation of a receipt jam signal.

20 Claims, 27 Drawing Sheets

DELAYED ANNUNCIATION OF RECEIPT JAM FOR AUTOMATED BANKING MACHINE

CROSS REFERENCE TO RELATED APPLICATION

This application claims benefit under 35 U.S.C. §119(e) of Provisional Application Ser. No. 60/422,664 filed Oct. 31, 2002.

TECHNICAL FIELD

This invention relates to automated banking machines. Specifically this invention relates to a transport and retrieval system for transaction receipts or other sheets delivered to a user operating an automated banking machine.

BACKGROUND ART

Automated banking machines are well known in the prior art. Automated banking machines may include automated teller machines (ATMs) through which consumers may conduct banking transactions. Other types of automated banking machines include devices which count or deliver cash or other items of value to a consumer, bank teller or other user, as well as point of sale (POS) terminals and other terminals which enable users to carry out transactions of value.

It is common for automated banking machines to provide the user with a printed receipt which documents each transaction. The receipts typically show the type of transaction and the value or amount involved. Other information may also be included on the receipt depending on the type of automated banking machine. Receipts may include information such as the user's name, the time of day, the location where the transaction was conducted and an account balance. Receipts may also include the user's card number and an account number of a user's account.

Often users of automated banking machines are in a hurry and forget to take the receipt after conducting a transaction. When this occurs the receipt typically remains extending outward from a receipt delivery opening in the machine until a next transaction is conducted and another receipt is provided. The subsequent receipt typically pushes the prior receipt out from the delivery opening and the prior receipt falls to the ground or on the floor adjacent to the machine.

In the case of automated teller machines, customers very often fail to take their receipt. This results in an unsightly litter problem in the area of the machine. The operators of such machines have to frequently clean up the area to keep it suitable for customers.

Failure to take a transaction receipt may also pose other problems. Specifically receipts may contain information and can be utilized by criminals. This information may include account numbers and balances which may be used for illicit purposes.

With the increased acceptance of automated banking machines, it is now often possible to print more information on transaction receipts. Often this information is of a private nature which users would not wish to have disclosed. While the provision of such information is of value to users who consistently take and review their receipts, consumers who do not run increased risks.

Systems have been devised for capturing currency and credit or debit cards which users fail to retrieve from an automated banking machine. However, mechanisms for retrieving such items are often complex and expensive. Such mechanisms also take up the limited space available inside an automated banking machine. While such retrieval systems are justified with regard to items of high value such as currency and credit and debit cards, such mechanisms have not been justified with respect to receipts.

There are also different types of receipt forms that have been used in automated banking machines. Certain machines use pre-printed forms with a predefined format. Such forms are always the same size when delivered to the user of a banking machine. Such forms commonly include pre-printed information such as the name of a financial institution. Such forms include a "top of form" (TOF) indicator which is a mark on each form which serves as a guide for printing on the forms as well as for separating the forms. The nature of TOF indicators may vary between form types and suppliers. As a result, a change in forms may necessitate adjustment of the machine to properly sense the TOF indicator on the new form type.

Other automated banking machines use plain roll paper for printing receipts. Generally the roll paper does not include pre-printed information. The color and quality of plain roll paper can vary. If the type of roll paper is changed the machine may require readjustment to properly detect and handle the new type of paper.

Automated banking machines which handle pre-printed forms with TOF indicators generally do not handle plain roll paper receipts and vice versa. Therefore an operator of an automated banking machine is limited to using the form type for which the machine is made.

DISCLOSURE OF INVENTION

Thus there exists a need for a receipt transport and retrieval system for an automated banking machine that retrieves a transaction receipt, which has been delivered but not taken by a user, and stores the receipt in the machine. There further exists a need for such a transport and retrieval system that is reliable, compact, and low in cost. There further exists a need for such a system that is suitable for use with receipts which vary in type and paper quality. There further exists a need for an ATM that reduces the risk of unnecessary receipt jam indications and which can be used to identify individuals who tamper with such machines.

It is an object of an exemplary form of the present invention to provide an automated banking machine with a receipt transport and retrieval system that delivers a receipt to a user.

A further object of an exemplary form of the present invention is to provide an automated banking machine with a receipt transport and retrieval system that retrieves receipts that have been delivered to a user but not taken.

A further object of an exemplary form of the present invention is to provide an automated banking machine with a receipt transport and retrieval system that stores receipts, which are not taken by a user, in a secure location in an interior area of the machine.

A further object of an exemplary form of the present invention is to provide an automated banking machine with a receipt transport and retrieval system that is simple and reliable in construction.

A further object of an exemplary form of the present invention is to provide an automated banking machine with a receipt transport and retrieval system that is small and compact.

A further object of an exemplary form of the present invention is to provide an automated banking machine with a receipt transport and retrieval system that is low in cost.

A further object of an exemplary form of the present invention is to provide a sheet transport for delivering a sheet from a sheet source to an outlet.

A further object of an exemplary form of the present invention is to provide a sheet transport and retrieval system that retrieves a sheet that is not taken.

A further object of an exemplary form of the present invention is to provide a sheet transport and retrieval system that can handle receipt forms of varied types and sizes.

A further object of an exemplary form of the present invention is to provide a sheet transport and retrieval system that can handle receipt forms having varied paper color and quality.

A further object of an exemplary form of the present invention is to provide a method for delivering sheets to an outlet and retrieving untaken sheets therefrom.

A further object of an exemplary form of the present invention is to provide a method for transporting and delivering receipts to a user operating an automated banking machine.

A further object of an exemplary form of the present invention is to provide a method for transporting and delivering receipts to a user operating an automated banking machine, which receipts comprise forms of various types and sizes and which forms have varied paper qualities.

A further object of an exemplary form of the present invention is to provide a method for retrieving a receipt that has been delivered but not taken by a user of an automated banking machine.

A further object of an exemplary form of the present invention is to provide a method for storing retrieved receipts in the interior of an automated banking machine and for periodically removing the retrieved sheets.

A further object of an exemplary form of the present invention is to provide a method of determining an indication of a jam event associated with a receipt.

A further object of an exemplary form of the present invention is to delay annunciation of a receipt jam signal.

A further object of an exemplary form of the present invention is to generate a receipt jam signal responsive to occurrence of at least two receipt jam event indications.

A further object of an exemplary form of the present invention is to generate a receipt jam signal responsive to at least two consecutive receipt jam event indications.

A further object of an exemplary form of the present invention to detect individuals responsible for and/or to prevent tampering and/or vandalism of an automated banking machine.

A further object of an exemplary form of the present invention is to identify a potential abuser of the automated banking machine.

Further objects of exemplary forms of the present invention will be made apparent in the following Best Modes for Carrying Out Invention and the appended claims.

The foregoing objects can be accomplished in an exemplary embodiment by an automated banking machine. The automated banking machine can include a transaction receipt transport and retrieval system and a sheet source in an interior area thereof. The sheet source can deliver a sheet which comprises a transaction receipt. The source can be a printer device that prints indicia on a form sheet responsive to transactions conducted at the machine. The automated banking machine may also include an outlet from which the user may take a sheet that has been delivered.

The system can include a movable belt flight or other drive mechanism that extends inside the machine between the sheet source and the outlet. A gate member can be positioned in intermediate relation between the source and the outlet. The gate member may have an arcuate profile in cross-section and be rotatably mounted adjacent to a belt flight and a sheet source.

The gate member in cross-section can have an arcuate outside surface and an arcuate inside surface. The outside and inside surfaces can terminate adjacent an edge. A slot can extend transversely in both the outside and inside surfaces. In a first rotational position of the gate member the belt flight can extend through the slot.

A storage location can extend in the interior of the machine intermediate of the gate member and the outlet, and can be transversely disposed from the belt flight. The storage location is suitable for housing numerous receipts which have not been taken by users.

In an operation related to a transaction conducted with the machine, the printer produces a transaction receipt form, which may be a paper sheet. The belt flight can move in an outward direction towards the outlet responsive to production of the sheet. The sheet can extend adjacent to the outside surface of the gate member and be engaged in a nip formed by the belt flight extending through the slot in the gate member. The engagement of the sheet can pull the sheet in the outward direction in engaged relation with the belt flight.

The force of the engaged sheet acting on the gate member can cause the gate member to rotate to a second position. In the second position the sheet is enabled to pass the gate member moving in an outward direction. Once the sheet passes the gate member, the gate member can return to the first position from the second position responsive to the force of gravity due to the weight distribution of the gate member. The sheet can be delivered to the outlet where it can extend through an opening in a fascia of the machine and be accessible to a user.

The machine can include a controller which includes one or more processors which may include a timer, and associated sensors. If the user fails to take the transaction receipt from the outlet within a set time, the belt flight can begin moving in an opposed inward direction.

The belt flight can carry the receipt in the inward direction in engagement therewith until it reaches the gate member. The inside surface of the gate member can engage the receipt and prevents it from reaching the sheet source. The inside surface of the gate member can direct the sheet in supported relation therewith into the storage location. The sheet transport can then be ready to deliver further sheets.

The exemplary embodiment can further provide for the ready removal of accumulated transaction receipts from the storage location. This is achieved by having the belt flight and gate member pivotally movable so as to enable ready accessing of the storage location during servicing.

The controller of an exemplary embodiment can be adapted to enable handling receipt forms of the pre-printed variety which include a top of form (TOF) indicator, as well as plain paper receipts. The exemplary embodiment may also be self-adjusting to accommodate changes in paper color and quality. The exemplary embodiment may also enable printing of receipts of varied size and may be operative to clear malfunctions that may occur, such as paper jams.

The exemplary embodiment of the present invention may further provide for delaying annunciation of a receipt jam signal until at least two consecutive receipt jam event indications are determined. The exemplary embodiment may also enable identification of a potential abuser of the automated banking machine.

BEST MODES FOR CARRYING OUT INVENTION

Figure 1:
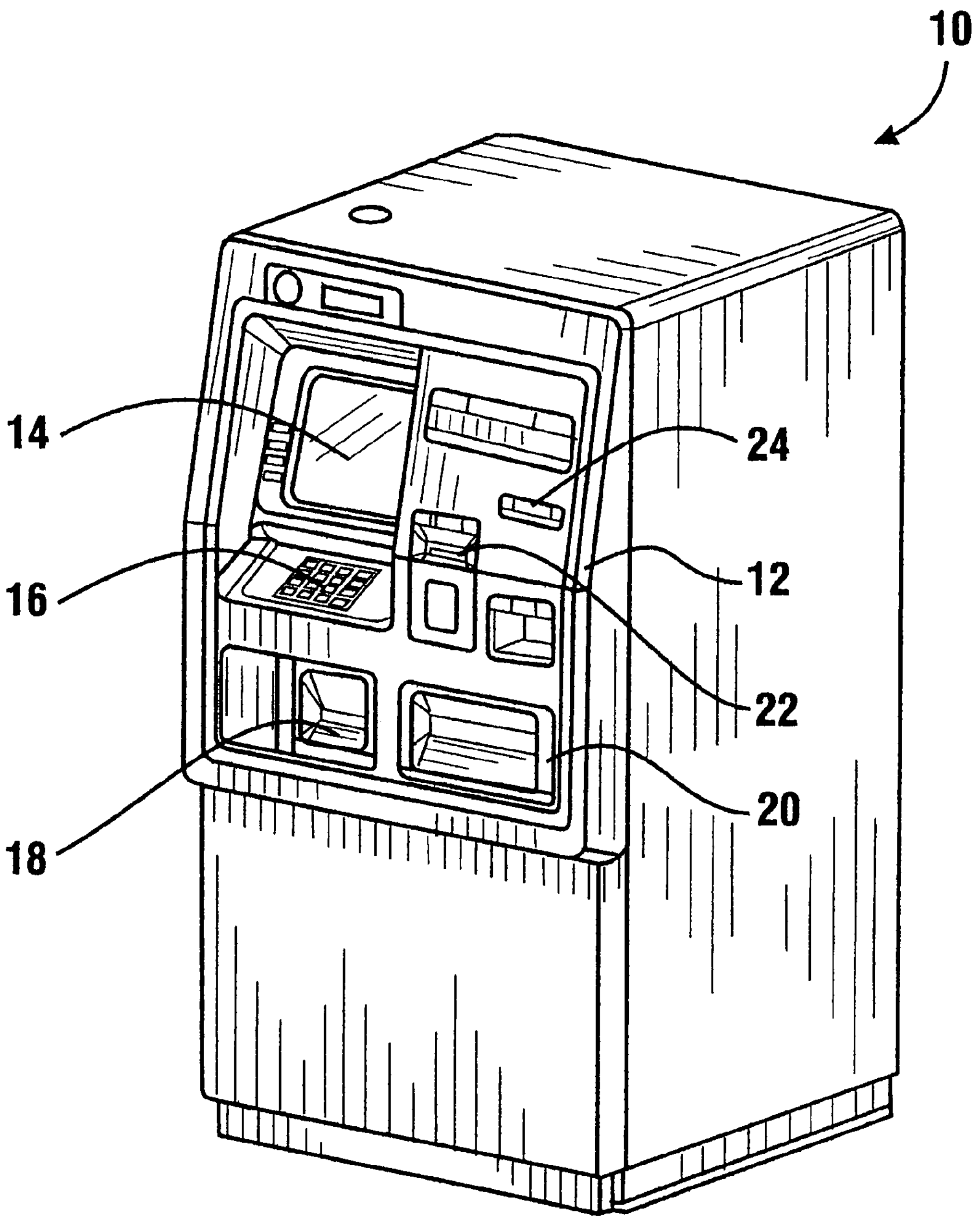
FIG. 1 is an isometric view of an automated banking machine.

Referring now to the drawings and particularly to FIG. 1, there is shown therein an isometric view of an automated banking machine generally indicated 10. Automated banking machine 10 is an automated teller machine. However, it should be understood that exemplary embodiments may be used in other types of automated banking machines including currency counting units, currency acceptors, scrip terminals, POS terminals and similar type devices.

Automated banking machine 10 includes a fascia 12 which includes a user interface. The fascia includes an opening through which a screen 14 may be viewed. A screen is used for providing instructions and delivering messages to the user. The fascia also has thereon a keyboard 16 through which the user may enter instructions.

The fascia also includes openings for other types of devices and mechanisms. In the embodiment shown these include a depository opening 18 into which a user may place deposits. A currency delivery opening 20 is also provided through which currency delivered from inside the machine by a cash dispenser is delivered to the user. The fascia also includes a card entry slot 22 wherein a user inputs a debit or credit card which is used to identify a user and/or their accounts and initiate operation of the machine. The fascia also includes a receipt delivery opening 24 through which transaction receipts are delivered to the user.

Figure 2:
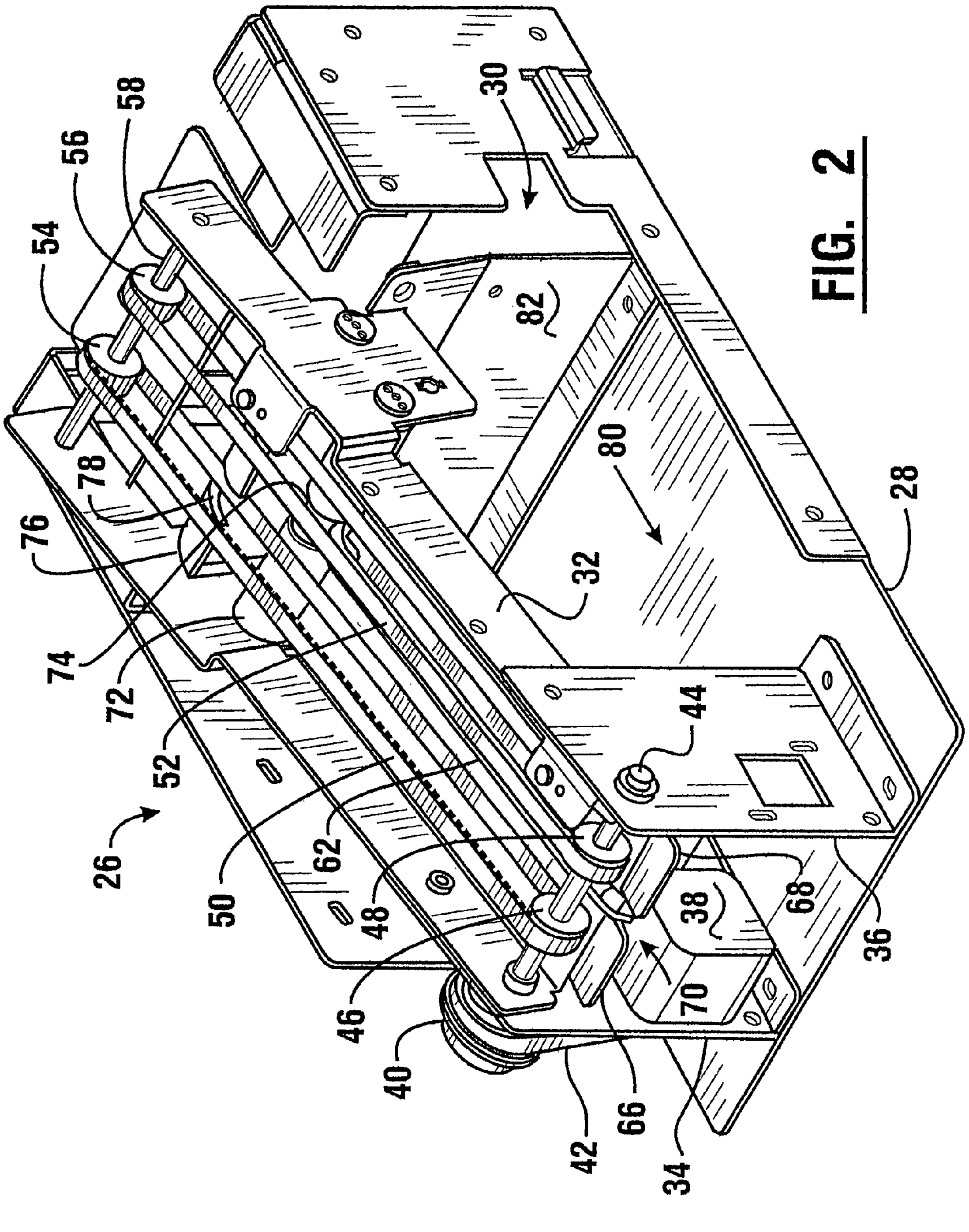
FIG. 2 is an isometric view of the receipt transport and retrieval apparatus of an exemplary embodiment of the machine.

The sheets which comprise the customer receipts are delivered to receipt opening 24 by the transport and retrieval apparatus generally indicated 26 in FIG. 2. Apparatus 26 includes a base 28 which is supported in an interior area of machine 10. Base 28 supports thereon a sheet source, which in the exemplary embodiment is a transaction receipt printer 30 (see FIG. 3). Printer 30 may be a conventional type receipt printer which prints receipts on sheets using thermal, dot matrix, ink jet, laser or other printing techniques. The printer also preferably is fed from a continuous roll or a fan-fold stack of paper. The printer also preferably includes a cut-off device for cutting sheets and separating them after the receipt information has been printed thereon. Embodiments may be used to produce receipts of uniform length or of varied lengths. The exemplary embodiment is also specifically adapted for use with either pre-printed type form receipts or plain paper-type receipts.

Apparatus 26 further includes a frame 32. Frame 32 is supported and rotatably mounted on a pair of uprights 34 and 36. Upright 34 supports a drive which includes a motor 38 which is operable to drive a pulley 40 through a belt 42. Pulley 40 in turn is connected to a shaft 44. Frame 32 is supported on and rotatably movable about shaft 44.

Figure 12:
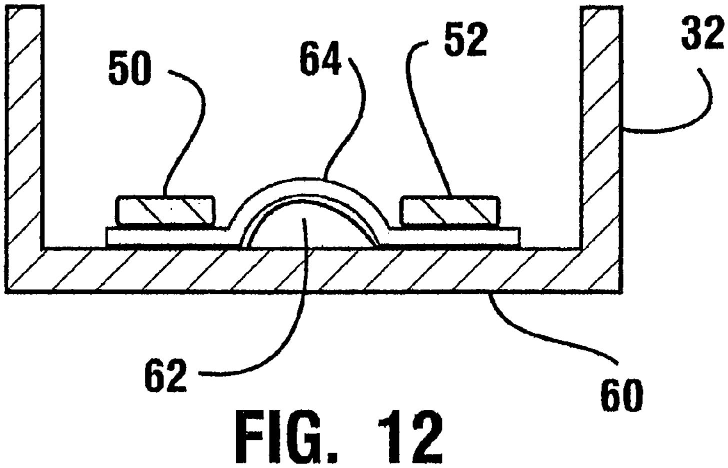
FIG. 12 is a cross-sectional end view of a frame and belt flights moving a sheet in the exemplary apparatus.

A pair of pulleys 46 and 48 are mounted on shaft 44. Pulleys 46 and 48 operate to drive a pair of transversely spaced belts 50 and 52 respectively. Belts 50 and 52 are continuous belts which extend about pulleys 54 and 56. Pulleys 54 and 56 are mounted on a shaft 58 at an opposed end of frame 32 from shaft 44. As best shown in FIG. 12, frame 32 in cross-section includes a lower wall 60. The inside surface of lower wall 60 includes an upward extending supporting projection 62 thereon. As shown in FIG. 12 a sheet 64 may be transported in engaged relation with lower flights of belts 50 and 52 and supporting projection 62. This arrangement provides for reliable transport of sheets with limited controlled slippage.

As shown in FIG. 2, lower wall 60 of transport 32 includes upturned end projections 66 and 68. End projections 66 and 68 include an opening 70 therebetween. Supporting projection 62 extends downward in opening 70.

Figure 3:
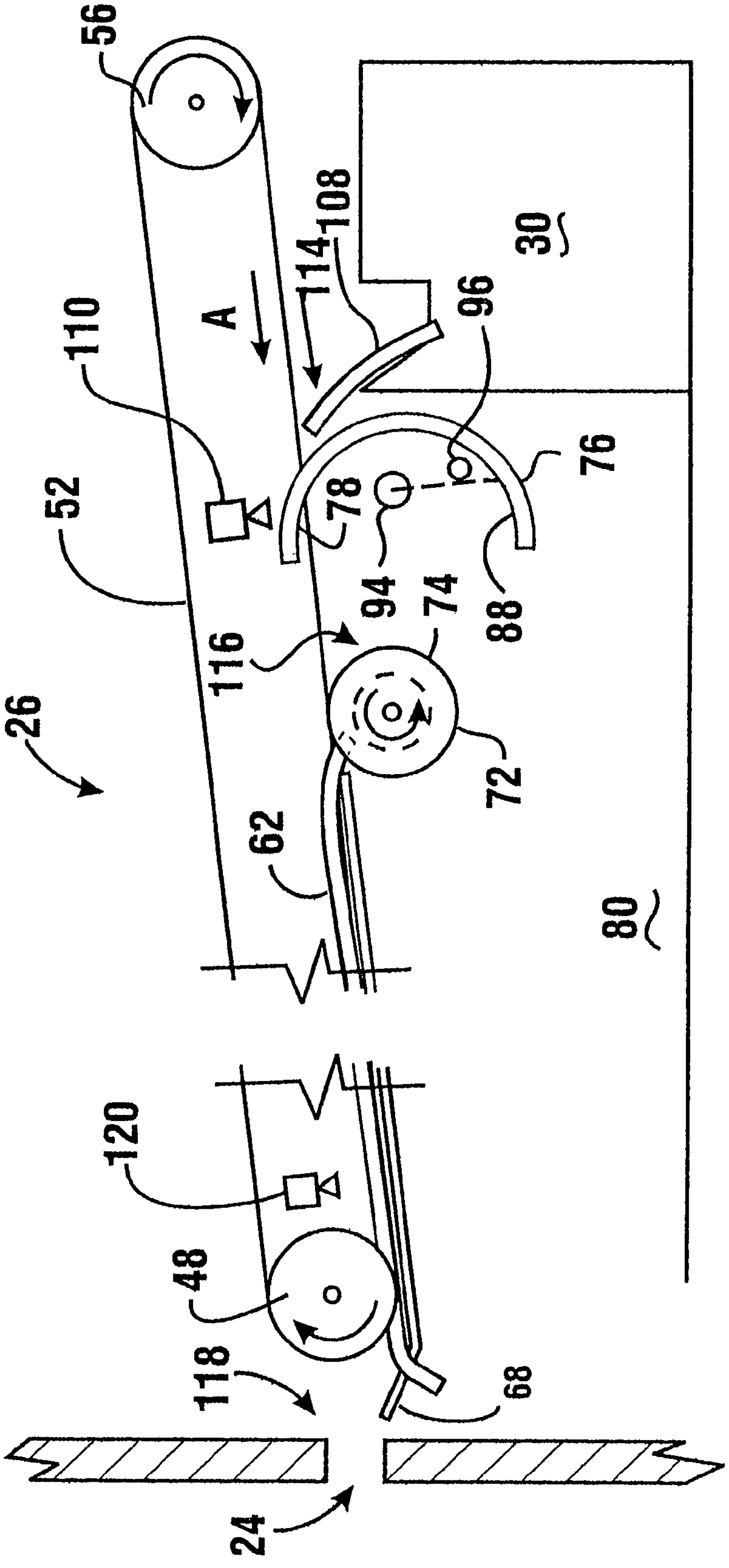
FIG. 3 is a schematic side view of the apparatus shown in FIG. 2 with the gate member in a first position.

Frame 32 further has supported thereon a roller 72 which serves as a supporting member. Roller 72 is free-wheeling and is generally engaged with the lower flights of belts 50 and 52. Roller 72 further includes a central recess 74 as shown in FIG. 3. Supporting projection 62 extends downwardly in recess 74.

A gate member 76 is rotatably mounted in supported relation on frame 32. Gate member 76 is shown in greater detail in FIGS. 9, 10, and 11. Gate member 76 includes a pair of slots 78 therein. The lower belt flights of belts 50 and 52 each extend in a slot 78 when gate member 76 is in the position shown in FIG. 2.

A storage location or bin generally indicated 80 is positioned generally below frame 32 in the operative position of the transport and retrieval apparatus shown on FIG. 2. Frame 32 is supported in the operative position by member 82, which is attached to base 28. As shown in FIG. 2, member 82 limits the downward rotation of frame 32 about shaft 44. An electrical switch is provided to sense when the frame is in the downward position in which the transport is operative to deliver sheets. It should be further noted that member 82 is configured to direct sheets produced by printer 30 toward the lower belt flights and gate member 76.

Figure 9:
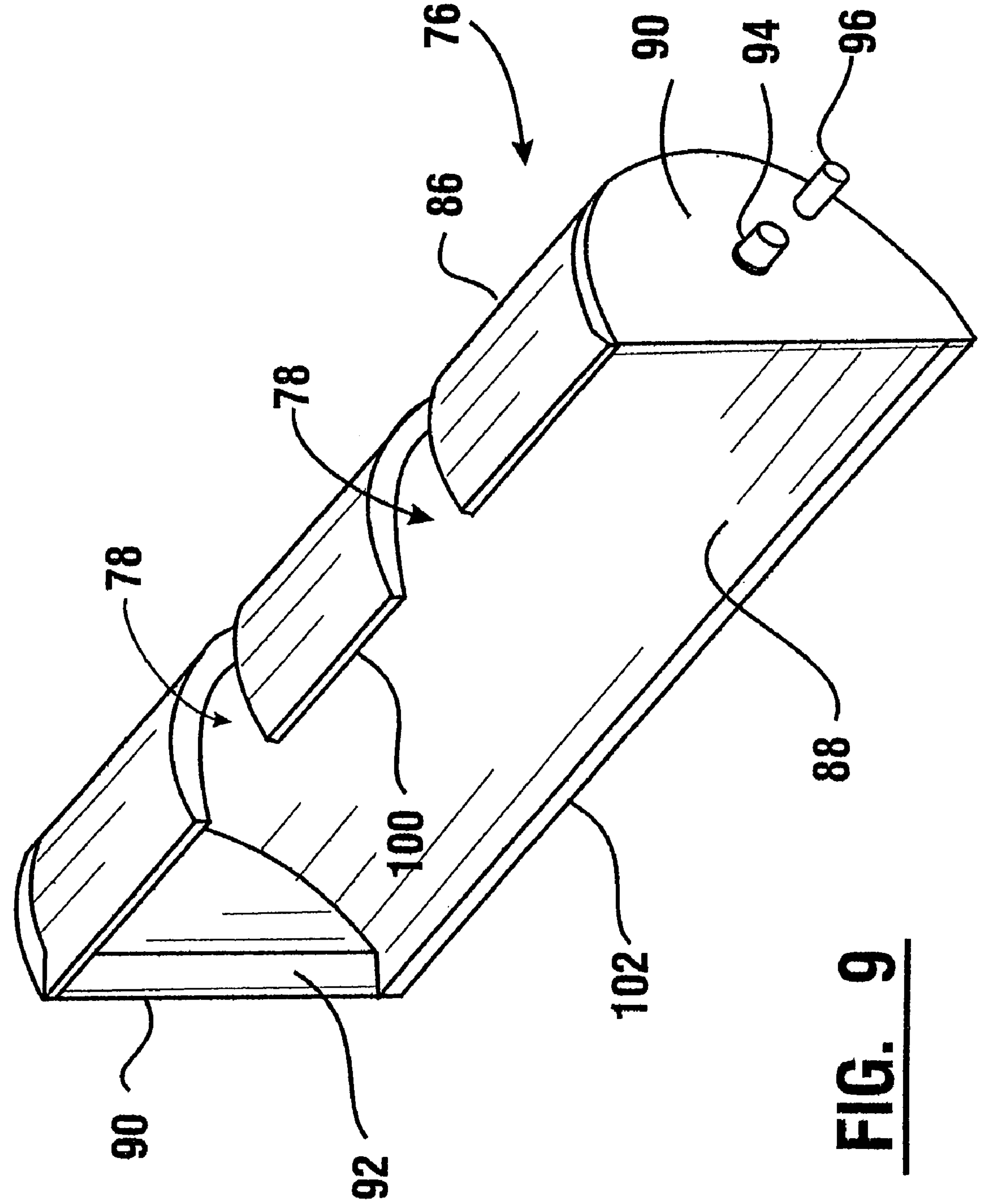
FIG. 9 is an isometric view of the gate of the apparatus.
Figure 10:
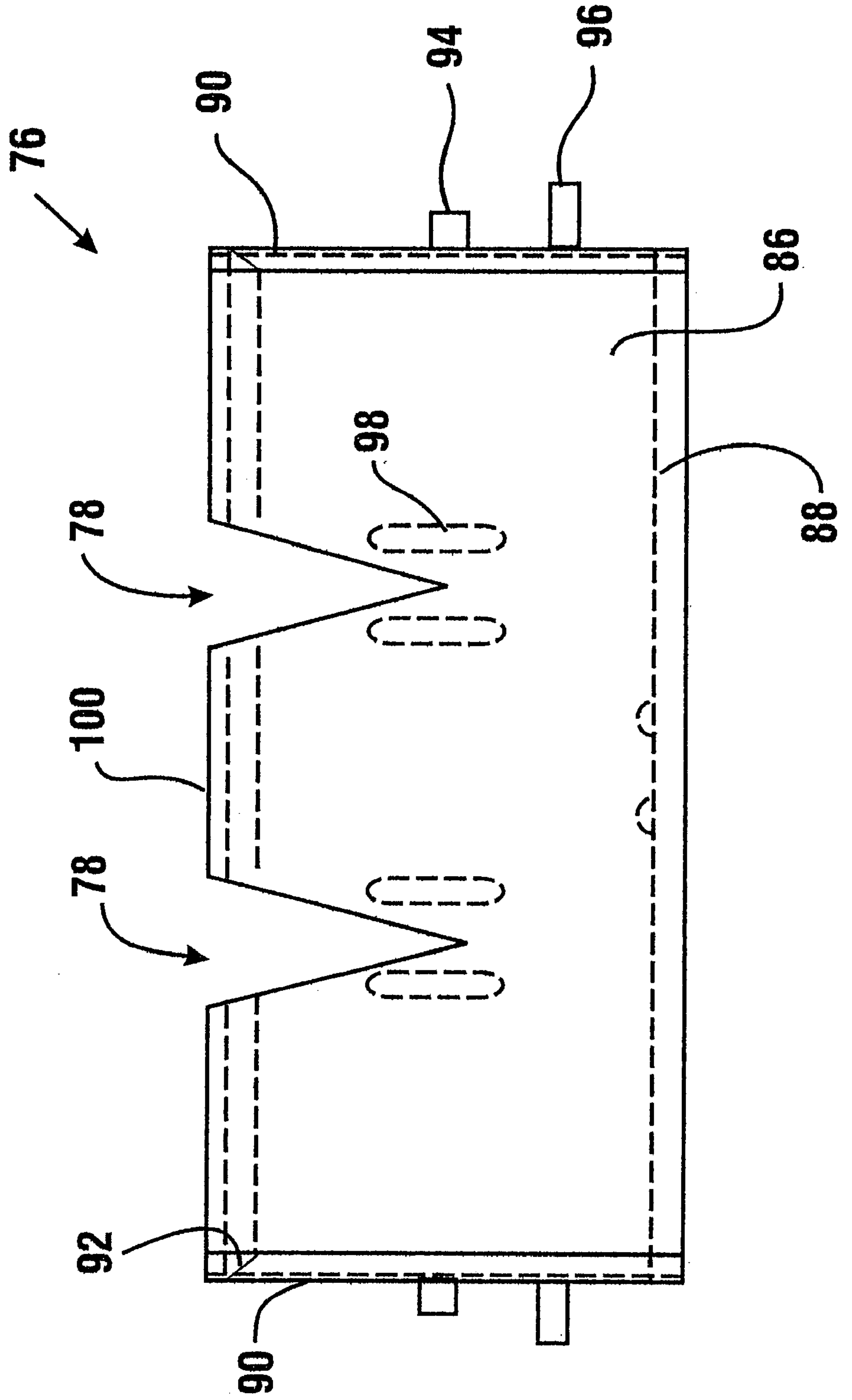
FIG. 10 is a top plan view of the gate shown in FIG. 9.
Figure 11:
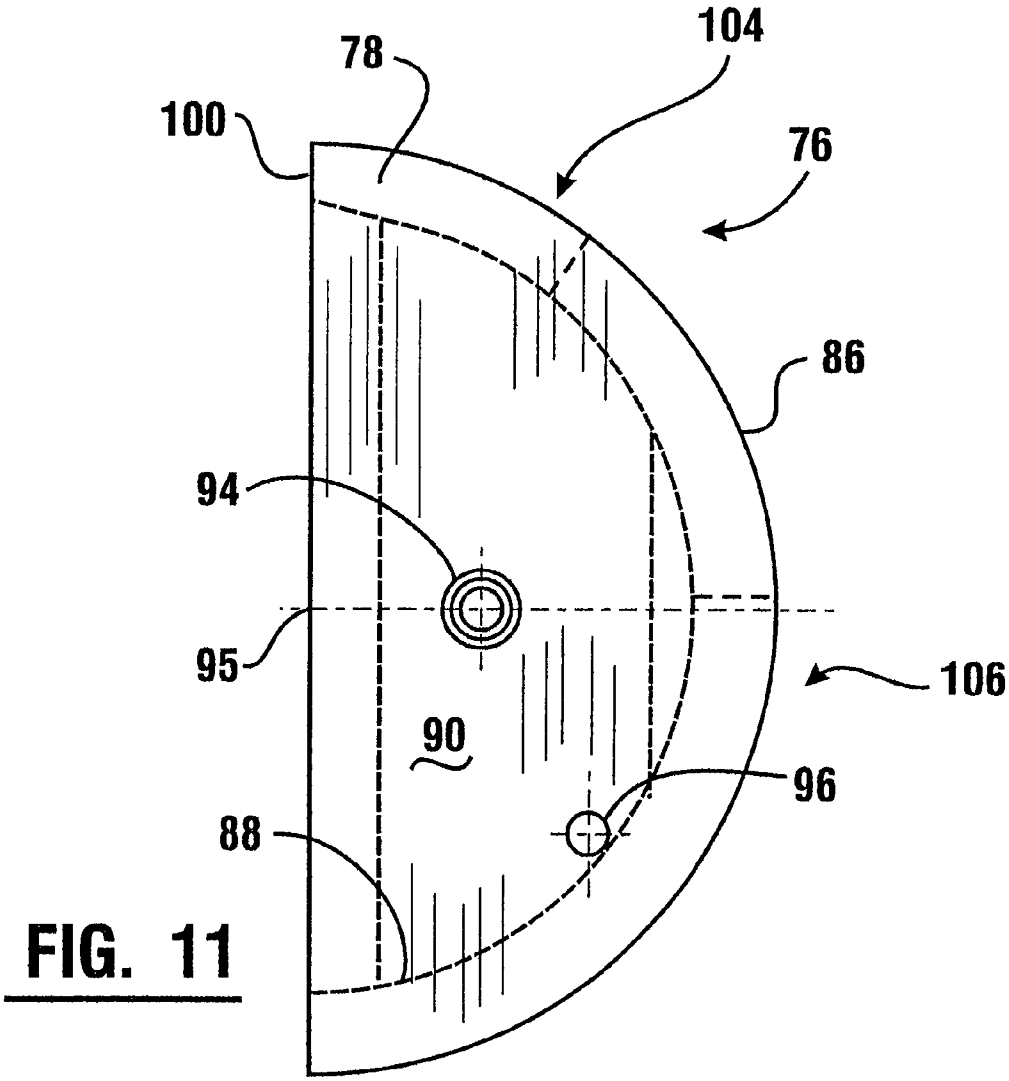
FIG. 11 is a right side view of the gate shown in FIG. 9.

Gate member 76 is shown in greater detail in FIGS. 9 through 11. Gate member 76 is arcuate in cross-sectional profile and includes an outside surface 86 and an inside surface 88. Gate 76 includes spaced end walls 90. End walls 90 have inwardly tapered portions 92.

End walls 90 further include a pair of outwardly directed shaft projections 94. Shaft projections are journaled in supported relation on frame 32 and comprise a pivot. It should be noted that shaft projections 94 are disposed off-center from a center of the arcs of the inside and outside surfaces. The center of the arcs is schematically indicated 95 in FIG. 11.

End walls 90 each further include outward extending stop projections 96. The purpose of stop projections 96 is later discussed in detail. Inside surface 88 further includes small inward extending projections 98 thereon. Inward extending projections 98 serve to break surface tension between sheets passing in supported relation with the inside surface in a manner later discussed. The inward extending projections 98 also keep the leading edges of sheets from catching on the bottoms of slots 78.

Gate member 76 further includes a top edge 100. Slots 78 extend transversely through the inside and outside surfaces of the gate member and terminate at top edge 100. Top edge 100 is somewhat tapered and thinned relative to the remainder of the arcuate profile of the gate member as shown in FIG. 11. Gate member 76 further includes a bottom edge 102. Inside surface 88 extends in an arc approximately 180 degrees between the top edge and the bottom edge. Slots 78 extend in a first portion generally indicated 104 of the outside surface of the gate member. The outside surface also has a second portion generally indicated 106 which is a smooth, arcuate surface and which provides low resistance to the movement of sheets thereon.

It should also be noted that because of the slots 78 and the absence of material therein, the gate member 76 is biased by gravity to rotate about shaft projections 94 in a clockwise direction from the position shown in FIG. 11. This weight distribution provides a biasing means which is operative to move the gate member in a manner later discussed.

The mechanical operation of the described embodiment is now explained with reference to FIGS. 3 through 7. Printer 30 delivers a sheet 108 which in the exemplary embodiment comprises a transaction receipt form. Printer 30 delivers the sheet 108 upwardly toward the lower belt flights of belts 50 and 52. Only belt 52 is shown in the Figures for purposes of simplicity.

Delivery of the sheet adjacent to the gate member is sensed by a first sensor 110. First sensor 110 is preferably a photoelectric optical type sensor. First sensor 110 is operatively connected to a controller 112 which is shown schematically in FIG. 5. The operation of the controller is later discussed in greater detail with reference to FIGS. 13 through 24. Upon the delivered sheet moving adjacent first sensor 110, controller 112 operates the drive by starting motor 38 to begin moving the lower belt flight in an outward direction generally indicated by Arrow A. The controller is operatively connected to a control device for the printer so that the drive begins moving responsive to operation of the printer having moved the paper an amount sufficient so that the paper sheet protrudes from the printer sufficiently to engage the belt flights. In other embodiments the drive may begin moving responsive to the sensor sensing the sheet moving adjacent thereto.

Sheet 108 is directed into a delivery area which includes a nip generally indicated 114 formed by the outside surface of the gate member and a downward facing first side of the lower belt flight. The delivery area is an area from which the form sheet delivered from the printer may be removed. The moving lower belt flight pulls sheet 108 into the nip and causes the sheet to engage the area on the outside surface of the gate member where the belt flight extends through the slot 78.

As shown schematically in FIG. 3, a stop serves to prevent rotation of gate member 76 in a clockwise direction. The stop operates by engagement of the stop projection 96 on the gate member with a surface of the frame. The stop assures that when the gate member is not being acted upon by a sheet moving in the outward direction, the gate member is maintained in the first position shown in FIG. 3.

Engagement of sheet 108 with gate member 76 and the lower belt flight of belt 52 causes the sheet to apply a force to the gate member. This force rotates the gate member in a counter-clockwise direction as shown, to a second position shown in FIG. 4. In this second position the sheet 108 is supported between the smooth second portion 106 of the outside surface of the gate member and the belt flight.

The gate member is preferably freely rotatably movable. Shaft projections 94 extend in journaled relation in frame 32. The force applied by sheet 108 moves the gate member to the second position without significant resistance. In the second position of the gate member, sheet 108 is enabled to readily pass in an outward direction over the outside surface of the gate.

It should also be noted that a gap 116 extends between the top edge 100 of the gate member and the roller 72. This gap is substantially closed as the gate member moves from the first position to the second position. This closure of gap 116 operates to insure that sheets passing over the gate member are directed to maintain engagement with the lower belt flight. The rotation of roller 72 is in a counter-clockwise direction as shown when the belt flight moves in an outward direction. As a result, any sheets which tend to maintain engagement with the outside surface of the gate member are directed against the moving surface of roller 72 and are directed back into engagement with the belt flight.

Figure 4:
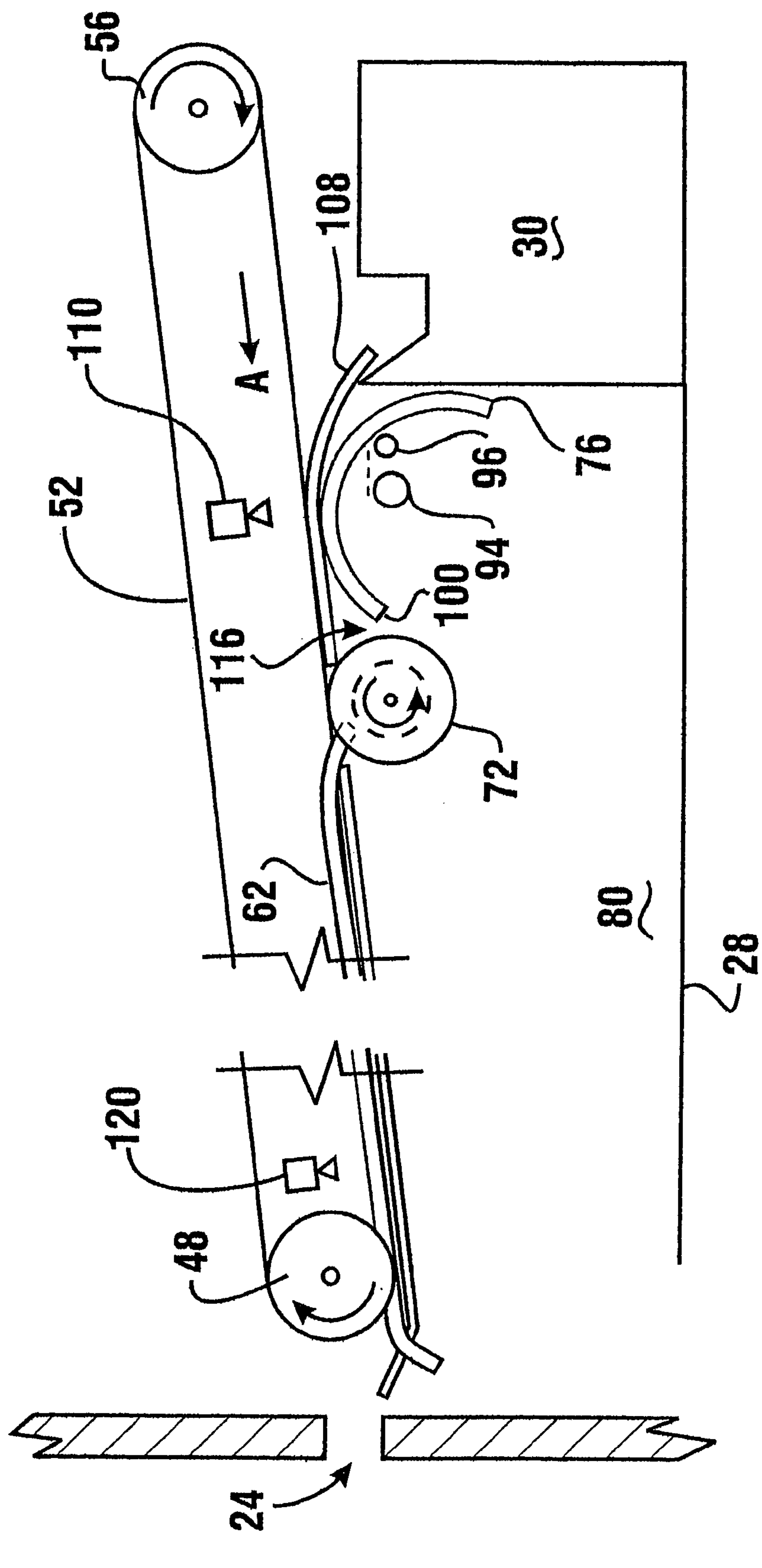
FIG. 4 is a view similar to FIG. 3 but with the gate member moved to a second position by engagement with a sheet.

It should be noted that the stop further limits movement of gate member 76 in the counter-clockwise direction. This is done by engaging the stop projection 96 with a further surface of the frame as indicated in FIG. 4. Thus the stop prevents the gate member from rotating too far in response to a force applied by the sheet.

Figure 5:
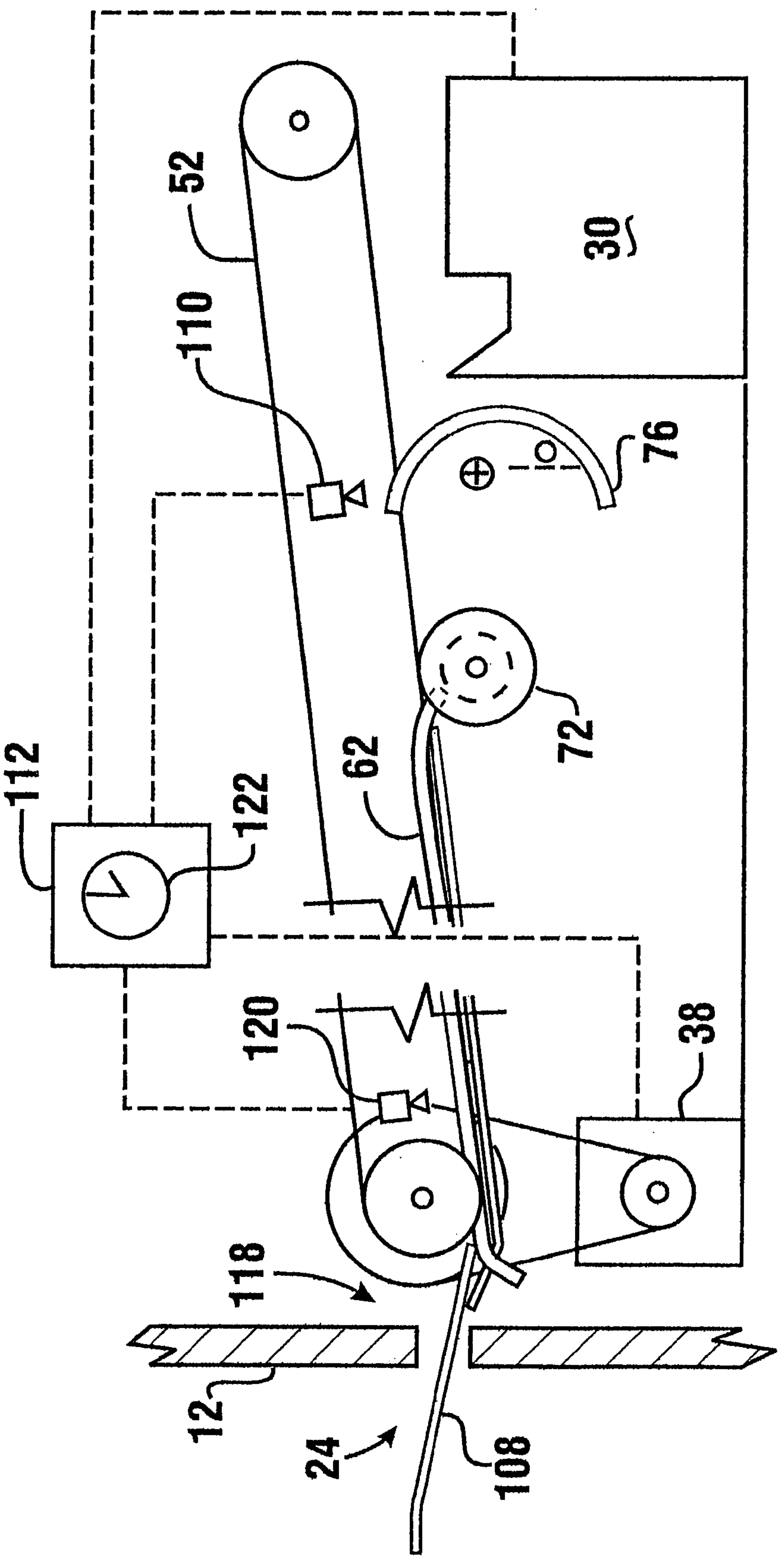
FIG. 5 is a view similar to FIG. 4 but with a sheet positioned at an outlet.

Sheets moving in the outward direction pass the gate member 76. Once the sheets are no longer engaged with the gate member, the gate member returns to the first position due to the biasing force of gravity as represented in FIG. 5. The sheets pass in the outward direction along a path which is preferably longer than a sheet length, until they reach an outlet generally indicated 118. At outlet 118 the sheet is accessible to the user. As shown in FIG. 5 sheet 108 extends outwardly at the outlet through the receipt delivery opening 24 in fascia 12.

The drive operates responsive to the controller to move the lower belt with the engaged sheet in the outward direction until a second photoelectric sensor 120 at the exit end of the path senses the passage of the inward end of the sheet. Sensor 120 is operatively connected to controller 112 which operates to stop motor 38, which stops the drive moving the lower belt flight. The controller then runs the transport in reverse until it again senses the inward end of the sheet, and then stops transport movement. In this position the sheet 108 remains engaged to the belt flight and is directed slightly upward by the end projections 66 and 68, so as to facilitate its removal by the user through the opening 24. The belt flights allow limited slippage so the user may manually remove the extending sheet without damage.

Controller 112 is operatively connected with a timer schematically indicated 122. Controller 112 preferably includes one or more processors, and timer 112 comprises a part of a programmed routine executed by a processor as later discussed. Alternatively, the timer may be resident in another system connected to the controller. In response to certain programmed conditions later discussed and after a set time, the controller operates a retract routine to move the drive in an opposed direction such that the lower belt flight moves in an inward direction as indicated by arrow B in FIG. 6. If the customer has not removed the sheet, the controller operates the drive so as to retrieve the sheet in a manner hereinafter described. If, however, the user has removed the sheet 108, the sheet will not be sensed and the controller executes programmed steps in response to this condition. Subsequently the apparatus is ready to deliver the next sheet.

Figure 6:
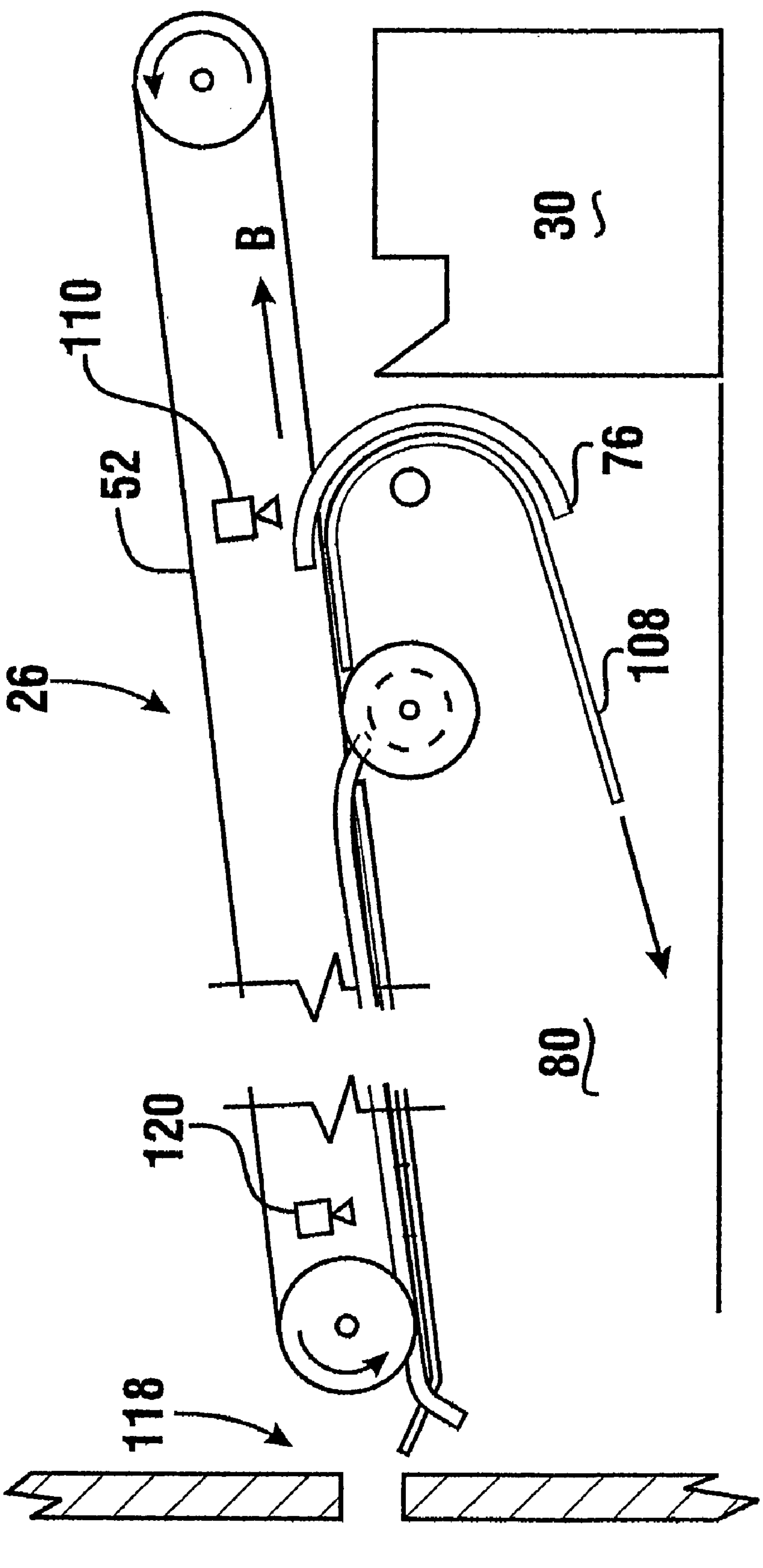
FIG. 6 is a view similar to FIG. 5 but with a sheet shown in the process of being retrieved.

If the user has not removed the sheet when timer 122 reaches the set time, the sheet continues to be sensed by second sensor 120. In response to programmed conditions being satisfied controller 112 operates the drive so that the lower belt flight moves in the inward direction. As a result sheet 108 moves in an inward direction away from the opening along the path until it engages the arcuate inside surface of gate member 76. Upon engagement of the inside surface of the gate member, the sheet is directed in supported relation thereon into the storage location 80. As shown in FIG. 6 as the sheet 108 passes over the inside surface of the gate member it is turned 180 degrees. The sheet is also sensed by sensor 110 as it moves adjacent to the gate member 76.

Figure 7:
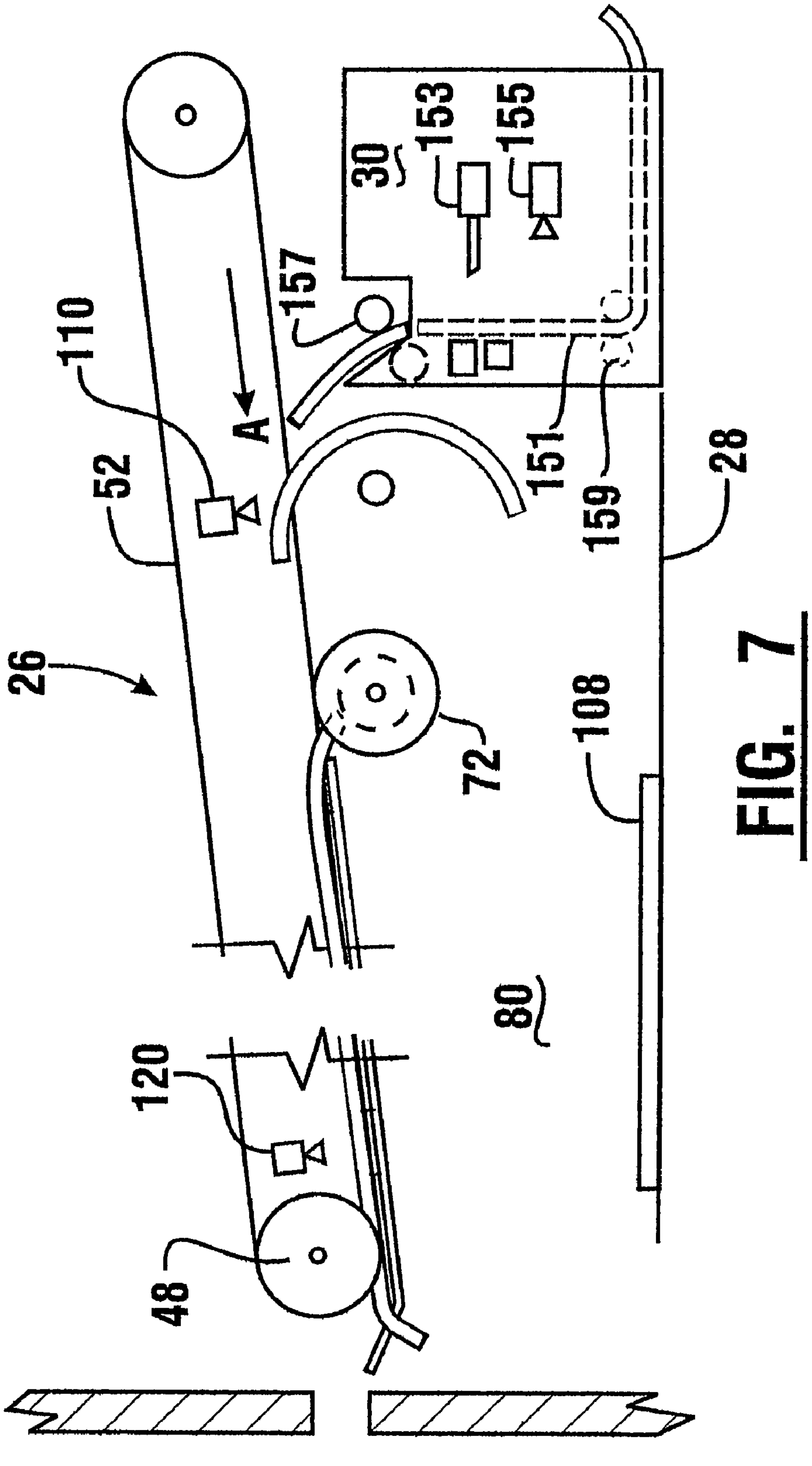
FIG. 7 is a view similar to FIG. 6 with the sheet retrieved and held in a storage location.

The controller 112 runs the drive with the lower belt flight moving in the inward direction for a sufficiently long time and in a manner to assure that the sheet is moved into the storage location. Upon the sheet reaching the storage location it preferably lies in a flat position supported on base 24. Because the retrieved sheet is delivered in a flat orientation, a large number of sheets may be stored in the storage location 80 before the retrieved sheets must be removed. As shown in FIG. 7 once the retrieved sheet has been delivered to the storage location, the transport and retrieval apparatus 26 is ready to deliver and retrieve further sheets from printer 30.

Figure 8:
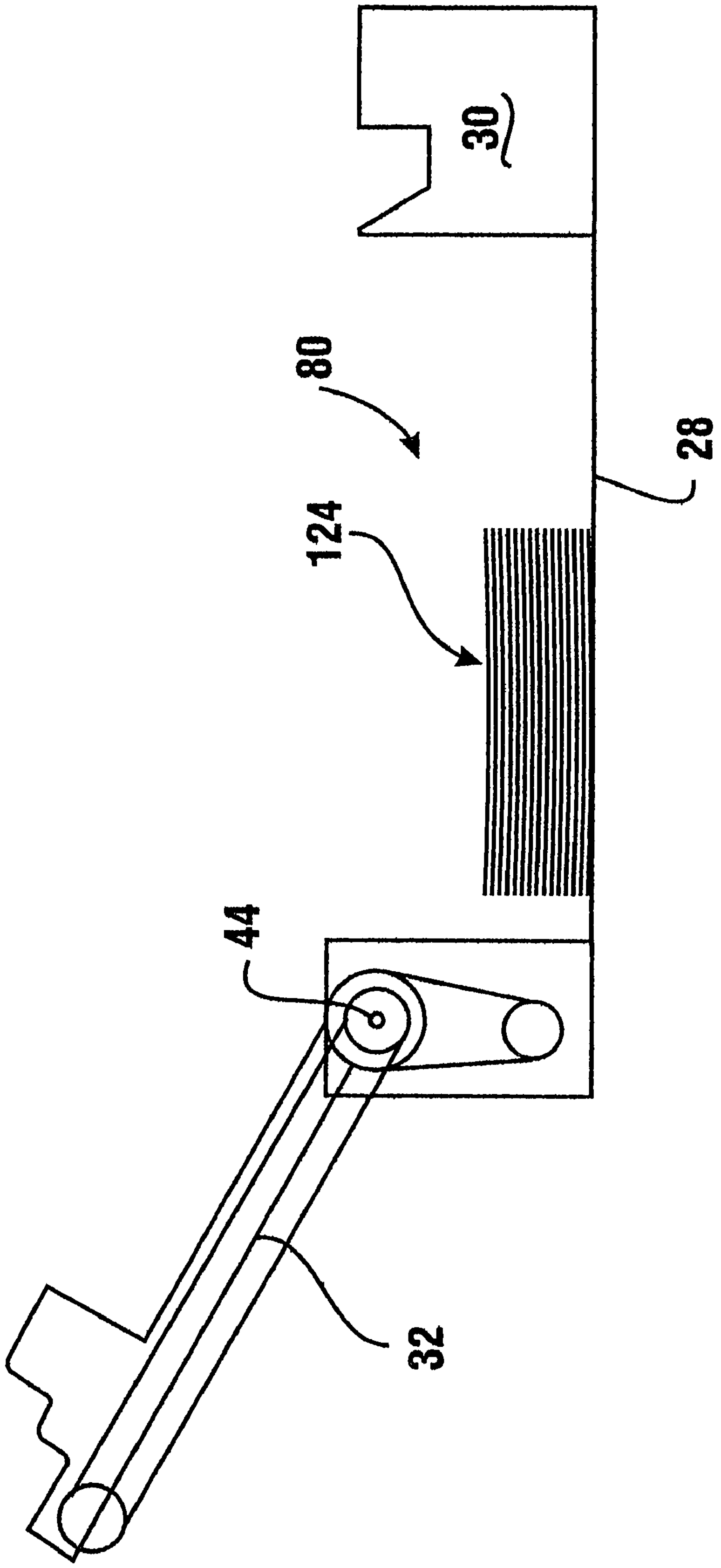
FIG. 8 is a schematic view of the apparatus shown in FIG. 2 moved to a service condition to access retrieved sheets in the storage location.

The removal of accumulated sheets is schematically demonstrated in FIG. 8. After a period of extended operation a stack 124 of retrieved sheets is housed in storage location 80. The controller is operative to detect when the storage location is full in a manner later discussed. The stack may be manually accessed and removed by rotating frame 32 about shaft 44 to the position shown in FIG. 8. This transversely disposes the frame and the belt flights supported thereon away from the storage location. In this position the stack 124 is more readily accessed for removal. Further, the printer 30 is also readily accessed for purposes of maintenance such as the changing of print cartridges or the replenishment of paper supplies or servicing. Once the stack 124 of retrieved sheets has been removed from the storage location, the frame 132 is returned to the operative position with the belt again extending between the sheet source which is printer 30, and the outlet.

The retrieved sheets of the embodiment shown lie in a generally horizontal orientation in the storage location 80. This is because the inside surface 88 of the gate member 76 extends generally about 180 degrees. However, in other embodiments the gate member can have different inside surface contours and angular configurations. For example, a 90 degrees arc may be used to align sheets vertically in a storage location. This may be desirable if storage location space is available only below the gate.

The system of exemplary embodiments may be operated by controller 112 in a number of different ways in response to the occurrence of certain programmed conditions. For example, the controller may operate to purge forms out of the receipt opening in response to the storage location 80 being full, or in response to the receipt being too long to retract. The controller may also operate in ways which are operative to correct malfunctions such as paper jams.

In the exemplary embodiment the controller 112 preferably includes a microprocessor. The controller is alternatively referred to herein as a computer. The microprocessor is in operative connection with a memory or data store. The memory is preferably a semi-conductor memory or firmware. However, in other embodiments other types of memories may be used. The controller which operates the receipt transport and retrieval system may also operate the printer 30 and control the printing of the receipt forms. In other embodiments separate controllers for the printer and the receipt transport and retrieval system may be used.

In exemplary embodiments the instructions which are executed by the controller are contained on an article. Such articles may include a hard disk, floppy disk, diskette, tape, removable drive, semiconductor memory, or other media suitable for holding the instructions which can be executed by the controller.

Figure 13:
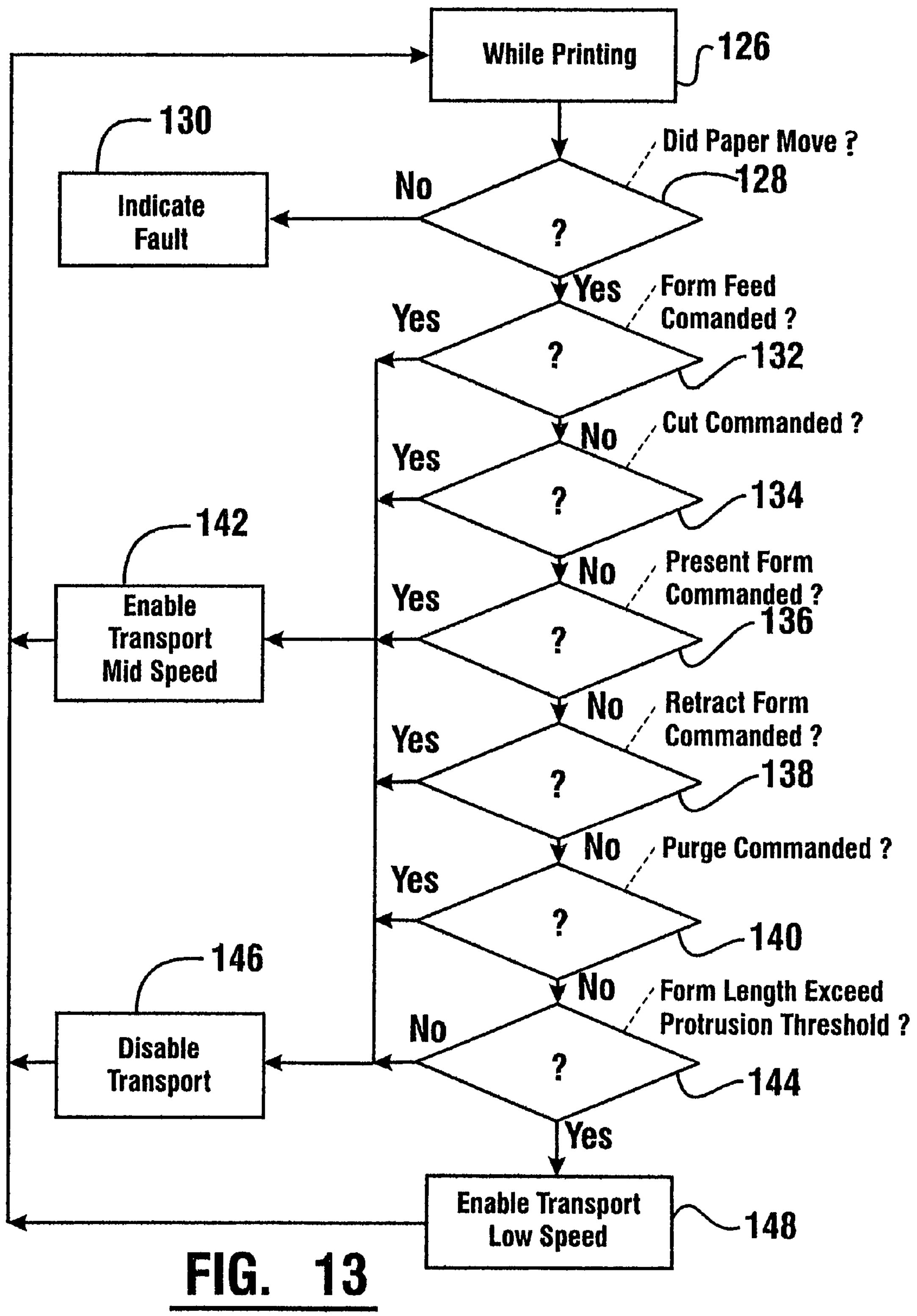
FIG. 13 is a schematic representation of steps executed by a controller of the exemplary embodiment in a printing and transport control routine.
Figure 14:
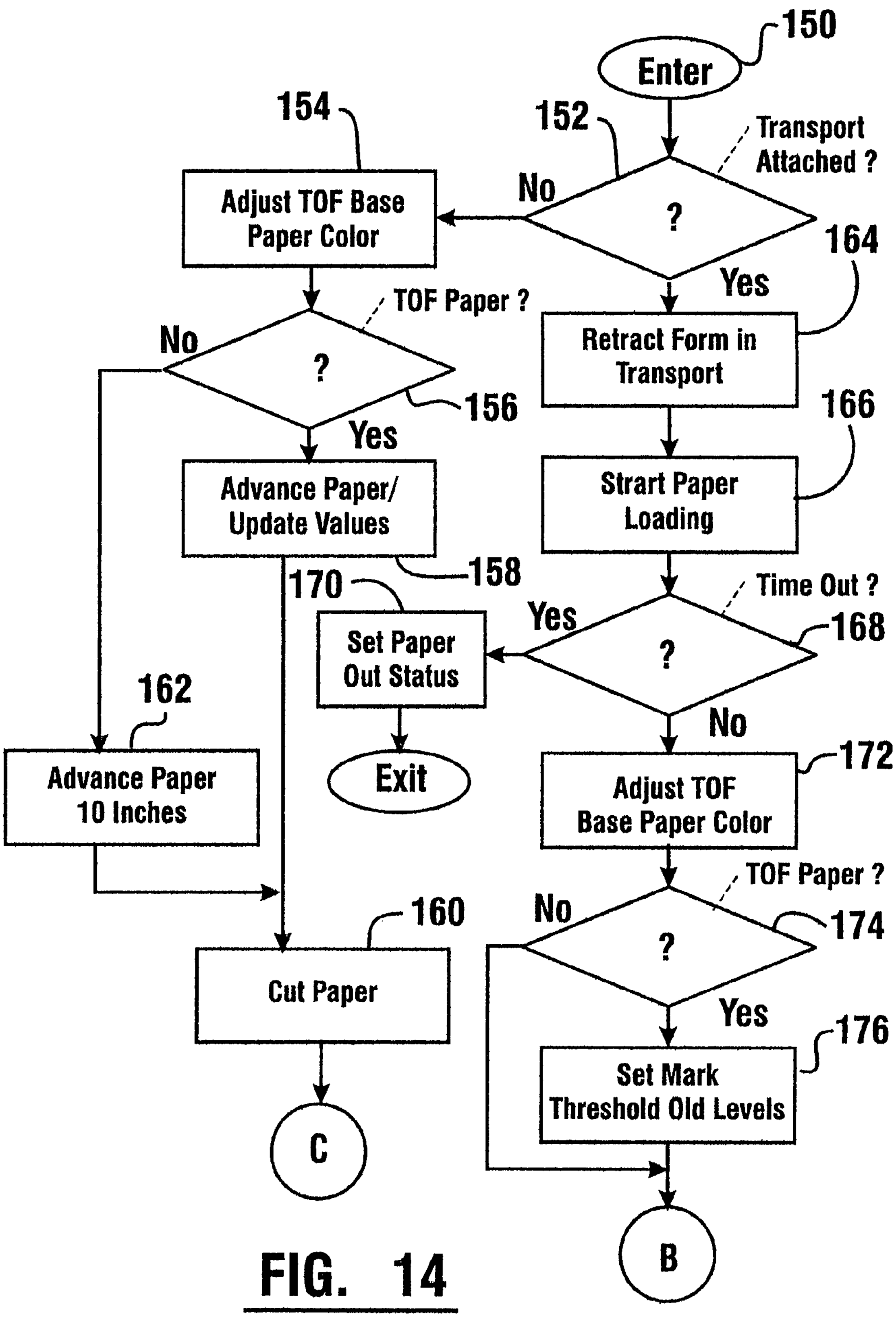
FIGS. 14 through 16 are a schematic representation of steps executed by the controller in a paper loading and grading routine.

Schematic representations of exemplary steps executed by the controller 112 are graphically represented in FIGS. 13 through 24. FIG. 13 is a schematic representation of the steps executed by the controller in a printing and transport control routine. The routine commences from a step 126 in which the printer is operating to print characters or other indicia on the paper. This will normally be done to print indicia corresponding to a transaction carried out through operation of the machine, such as a cash dispensing transaction. At a step 128 the determination is made by the controller 112 as to whether the paper on which printing is being conducted was sensed as having moved in response to the printer efforts to move the paper. Paper movement is preferably sensed using the system shown in U.S. Pat. No. 5,725,321, the disclosure of which is incorporated herein by reference. If it is sensed that the paper is not moving in response to the printer, a fault indication is given by the controller at a step 130.

If the controller senses that the paper is properly moving in response to the printer, the controller next determines at a step 132 if it has received a form feed command. If not, the controller next checks at a step 134 to determine if it has received a cut command which is indicative of an instruction to the printer to cut the paper. If no cut command has been received, a check is made at a step 136 to determine if a present form command has been received. If no command to present a form has been received, a determination is made at a step 138 if a command to retract the form has been received. Finally, a check is made at a step 140 to determine if a purge command has been received. If any of the commands represented in steps 132 through 140 have been received, the controller is operative at a step 142 to enable the transport to operate at medium speed. The transport is operated in accordance with the particular steps associated with the command that it has received which are hereinafter discussed. From step 142 the controller returns to step 126.

If none of the commands in step 132 through 140 have been received, a decision is made at a step 144 as to whether the length of paper that the printer has operated to print upon in the current form sufficiently protrudes from the printer to engage the belt flights of the transport. This is preferably done by the controller comparing a distance that the paper has been moved since the last cutting operation to a stored value. If the paper is not yet sufficiently long to engage the belt flights the transport is temporarily disabled at a step 146 and the program steps return to step 126. Once the paper has reached a sufficient length to engage the belt flights the controller executes a step 148. Step 148 is operative to begin moving the belts of the transport in a forward direction at a slow speed. In the forward direction the belt flights urge the sheet to move towards the receipt opening 24. As previously discussed, the configuration of the exemplary transport is such that the belts are enabled to overrun in engagement with the receipt form. From step 148 the belts continue to run at low speed until one of the other commands is received.

FIGS. 14 through 17 schematically demonstrate the steps executed by the controller as part of the paper loading and grading routine. The exemplary embodiment is operative to sense characteristics of the paper so that the controller may dynamically store and change stored threshold values to match the character of the paper in the sheets being used. The exemplary form is dynamically adaptable to paper of varying quality and color. The controller is also preferably operable to store and update threshold values that are indicative of paper being sensed adjacent to a sensor as printing activities are conducted. In this way the exemplary form of the system is enabled to operate properly with paper types that vary substantially. It also accommodates variations in the paper which occur in the middle of a roll or fanfold stack. The system also dynamically adjusts to the optical properties of "top of form" (TOF) marks when TOF type paper is used.

The paper loading and grading routine commences with an entry step 150 after which a check is made at a step 152 as to whether the transport for the receipts is in the operative position. If the transport has been moved to the position for servicing, such as for changing the paper supply, the controller will next execute a step 154. In step 154 the controller is operative to adjust a base paper color value to conform with that presented at a sensor 155 (see FIG. 7). Sensor 155 is preferably positioned within a paper path indicated 151 within the printer 30. The sensor 155 is positioned in the paper path at a location in advance of at least one paper drive mechanism schematically indicated by rolls 157, 159 which engage the paper and move it in the paper path. The sensor 155 is also preferably positioned in the paper path in advance of a paper cutter mechanism, schematically indicated 153. Cutter 153 is selectively operative to transversely cut the paper in the paper path. Sensor 155 is positioned sufficiently inward in the paper path so that when the end of the paper is sensed at the location by the sensor, the remaining paper can be moved outward by rolls 157 to engage the belts of the transport at the nip 114.

In the exemplary embodiment the sensor 155 is an optical type sensor that includes an emitter and a receiver. The controller is operative to adjust the intensity of the emitter so that the level of light reflected from the paper and sensed by the receiver in sensor 155 is increased to above a desired level. This assures that sensor 155 may reliably sense the paper adjacent thereto. In alternative embodiments however, a stored threshold level of the signal from the receiver may be appropriately adjusted to indicate the presence of paper, or both emitter and receiver threshold levels may be adjusted in response to characteristics of the paper. This is preferably accomplished based on reflectance from at least two spaced areas on a sheet, which are then used to set the threshold. For example, the readings from the two spaced locations may be averaged, and then an offset taken from the average for purposes of establishing the threshold level. The signals from sensor 155 may also be used to change emitter values or to adjust the paper sensing thresholds for signals from sensors 110 and 120.

At a step 156 a determination is made as to whether the paper which is being used is top of form ("TOF") paper. This may be done by an input from a service technician to the controller. However, in alternative embodiments it may be done automatically by the sensor 155 detecting variations in reflectance from the paper which are indicative of the presence of TOF marks. TOF marks are dark marks which are positioned on each sheet form. They are used to provide a reference for the printing and cutting of the form. Because TOF marks are uniformly positioned and are much darker (less reflective) than the surrounding surface of the form, the controller may be programmed to respond to the significant reflectance fluctuations associated with TOF marks and make the decision in step 156 based on the presence or absence of such fluctuations.

If TOF paper is indicated to be present in step 156, the controller next executes a step 158. In step 158 the printer is operative to advance the paper using rolls 157 and/or other drive mechanisms a sufficient distance to collect sample information concerning both the reflectance of the paper in the area of the TOF marks as well as in areas disposed from the marks. In the exemplary embodiment in step 158 the paper is advanced by the printer a distance of at least two TOF marks and threshold values corresponding to the presence of paper and the presence of a TOF mark on the paper adjacent to sensor 155 are updated and stored in memory. Thereafter the controller executes a cut form routine at a step 160 which is later described in detail, and proceeds to the steps that are later discussed in connection with FIG. 16.

If it is determined at step 156 that the paper that is being used is not TOF paper, the controller next executes a step 162. In step 162 the paper is advanced a sufficient distance to insure that the printer is enabled to move the paper reliably. In the exemplary embodiment the paper is moved forward about 10 inches. Thereafter the controller proceeds to step 160 and cuts the paper using cutter mechanism 153.

If at step 152 it is determined that the transport is in the operative position the computer next executes a step 164. Step 164 is a retract routine which is later discussed in connection with FIGS. 22 and 23. In the retract routine the controller is operative to move the belts of the transport to assure that any form therein is retracted and moved into the storage location 80. This step assures that before new paper is loaded the transport is clear.

The controller next executes a step 166. At step 166 the paper is moved forward in the paper path 151 by the drive mechanism in the printer. At a timing step 168 it is checked to see if an elapsed time has expired without the paper being sensed. If the paper has been attempted to be moved forward beyond the elapsed time without being sensed, the controller executes a step 170 in which the controller sets a status indicating that the printer is out of paper or is experiencing a similar fault. From step 170 the controller exits the routine.

If the paper is sensed within the elapsed time permitted in step 168, the controller moves on to a step 172. Step 172 is similar to step 154 previously discussed. In step 172 the controller is operative to evaluate the signals received from sensor 110 and to adjust the threshold intensity of the emitter associated with the sensor, or the threshold levels for signals from the sensor receiver to correspond with the reflectance characteristics of the paper which has been loaded. The controller then moves on to a step 174 which is similar to step 156 wherein a determination is made as to whether or not the paper that has been loaded is top of form paper. As with the previously discussed step this may be done based on an input or may be determined based on variations in paper reflectance.

If top of form paper is being used the controller executes a step 176 in which it sets threshold levels for detection of a TOF mark on the paper. These TOF mark threshold levels are set based on the general reflectance of the paper which is determined at step 172, if the decision as to the presence of TOF paper is based on a manual input. If the determination is made automatically, the mark threshold levels may be based on the reflectance characteristics of the TOF mark(s) sensed in the determination process.

Figure 15:
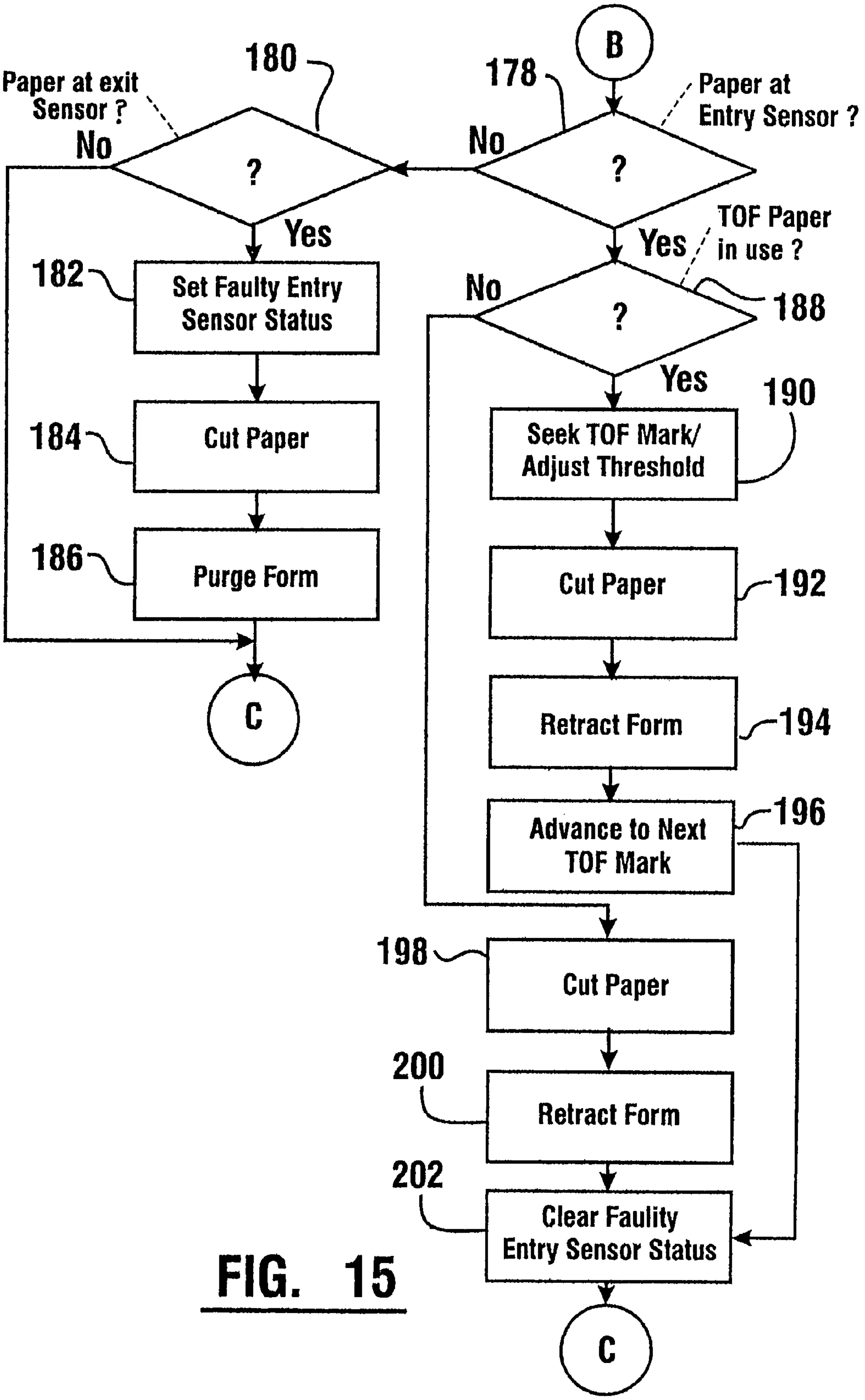

As shown in FIG. 15, the controller next executes a step 178 in which a determination is made whether the paper is adjacent to sensor 155. If paper is not sensed adjacent to the entry sensor a determination is made at a step 180 as to whether the paper is sensed adjacent to the exit sensor of the transport which is second sensor 120. If paper is sensed adjacent to the exit sensor but not sensor 155 then there is a problem and a faulty entry sensor status is set at a step 182.

After step 182 the controller is operative to execute a cut paper routine at a step 184 and execute a purge form routine at a step 186. These routines are later discussed in detail. Thereafter the controller proceeds to execute the steps shown in FIG. 16.

If at the decision step 178 paper is sensed adjacent to the sensor 155, the controller proceeds to a step 188. Step 188 is again a determination as to whether or not top of form paper is in use. This determination may be based on an input from a user, based on a determination from variations in reflectance values from the paper, or based on the decision that was made in step 174.

If it is determined that TOF paper is being used at step 188 the controller proceeds to a step 190. In step 190 the printer is operative to move the paper so as to place a TOF mark adjacent to sensor 155. The controller is thereafter operative to adjust the threshold representative of the presence of a TOF mark. This may be done by either adjusting the threshold intensity of an emitter associated with the sensor or adjusting the threshold signal values corresponding to the adjacent TOF mark.

After adjusting the thresholds associated with the adjacent TOF mark in step 190, the controller then executes the cut paper routine at a step 192. After cutting the paper the controller executes the retract routine at a step 194 and advances the paper to position the next TOF mark adjacent to sensor 155 at a step 156.

Alternatively, if in step 188 it is determined that top of form paper is not being used, the controller advances to a step 198 in which a cut paper routine is executed. At step 200 the form that has been cut is retracted back into the storage location. At either step 196 or step 200 the controller is operative to execute a step 202 which clears any residual status indication that the reading from the entry sensor is faulty.

Figure 16:
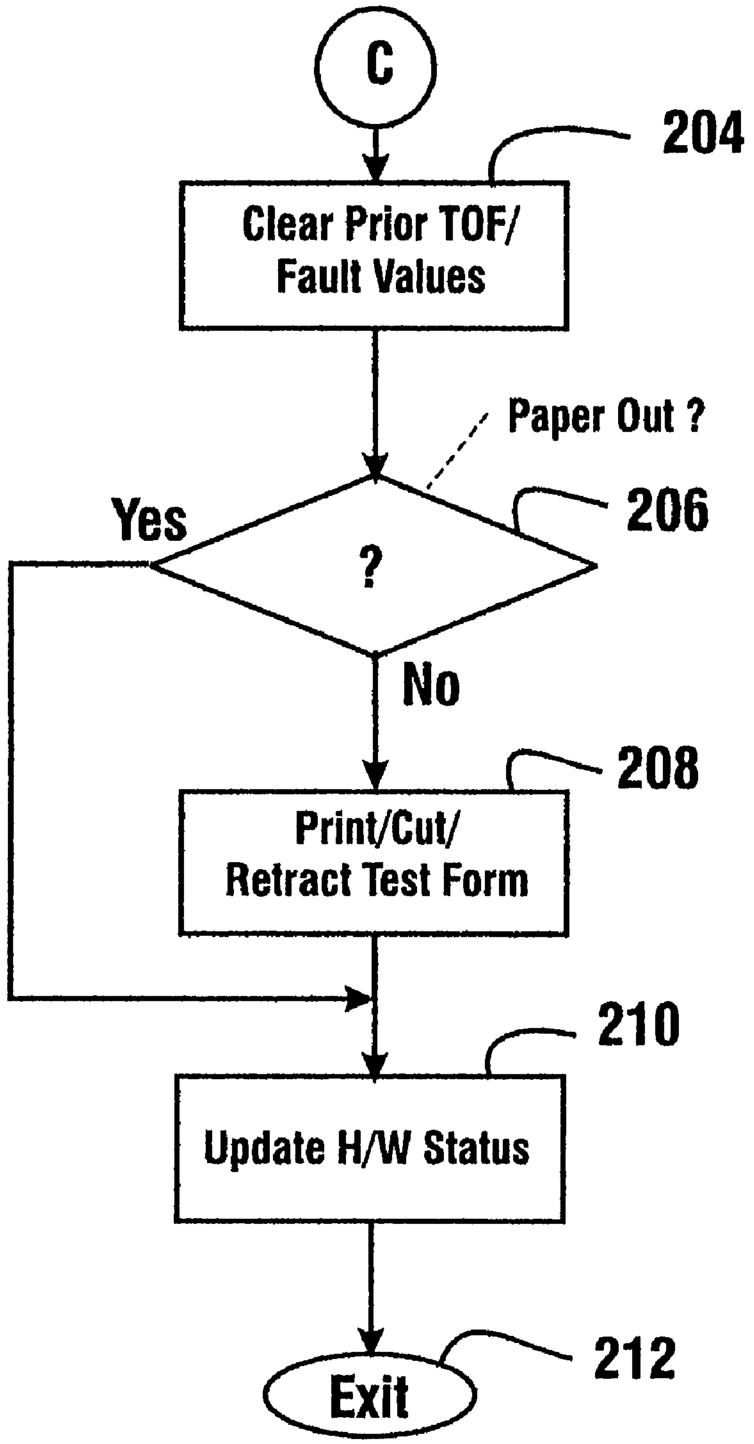

From either step 186, step 202 or step 160 the controller proceeds to step 204 shown in FIG. 16. In step 204 the prior values which the controller had been using for sensing TOF marks prior to execution of the current paper loading and grading routine are deleted. Similarly, prior fault values such as a fault value indicative of a paper out condition which existed prior to the current paper loading routine are cleared.

At a step 206 a determination is made as to whether in the course of the paper loading and grading routine currently being executed, a "paper out" condition was sensed. If not, the controller proceeds to a step 208. In step 208 the controller executes a preprogrammed routine in which it prints a test pattern on a single form, advances the form appropriately based on whether the form is a TOF form sheet or plain paper sheet and executes a cut routine and a retract routine to place the form in the storage location.

If the test routine at step 208 executes successfully, information indicative thereof is indicated in the program parameters of the controller at a step 210. Of course, if the apparatus has been determined to be out of paper at step 206, status information indicative thereof is updated at step 210. After the status information is updated the controller exits the program at a step 212.

During printing the printer responds to electrical signals from the controller which are indicative of the indicia to be printed on the form that is to be delivered. As indicated in FIG. 13, once the amount of printing which has been done on the form is sufficient to cause the form length to exceed a threshold, the controller executes a step 144 which enables the transport to begin moving at a step 148. As printing continues the form extends in the transport past the gate member, In the case of a plain paper form the form may be a variable length which is determined by the amount of printing thereon. In the case of a TOF form the form may be one or more connected TOF sheets extending in the transport.

Figure 18:
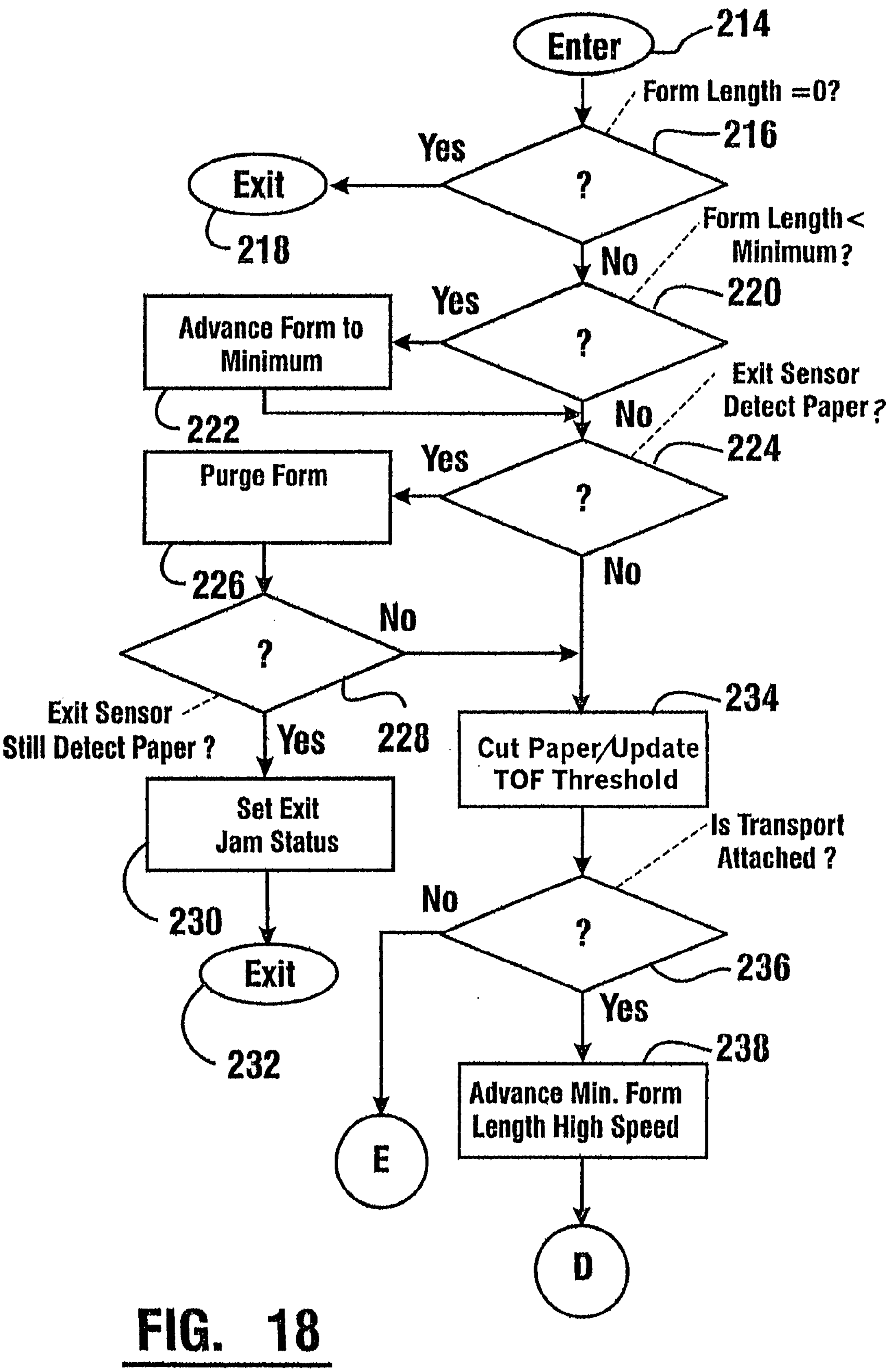
FIGS. 18 through 20 are a schematic representation of steps executed by the controller in a cut form routine.
Figure 19:
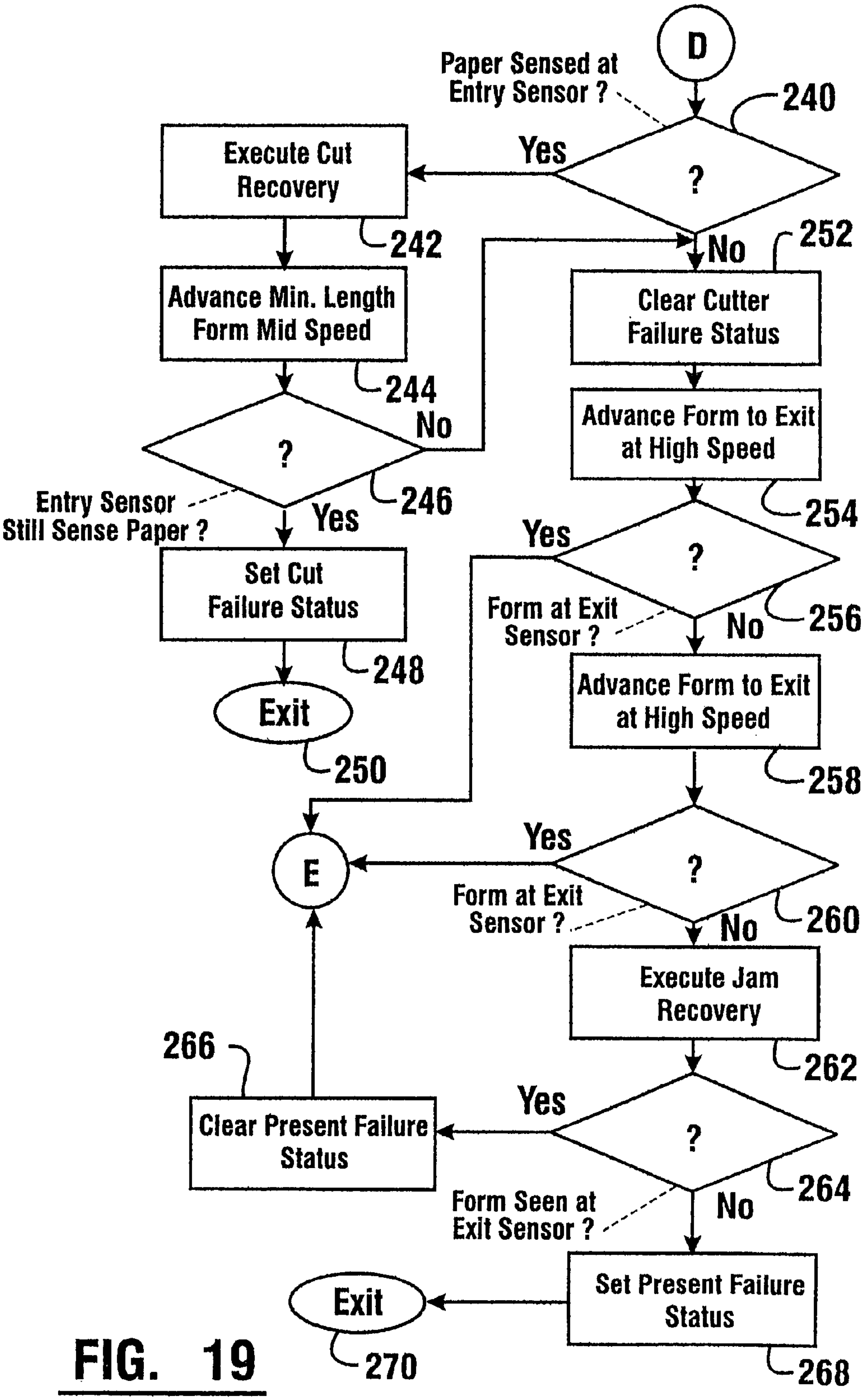
Figure 20:
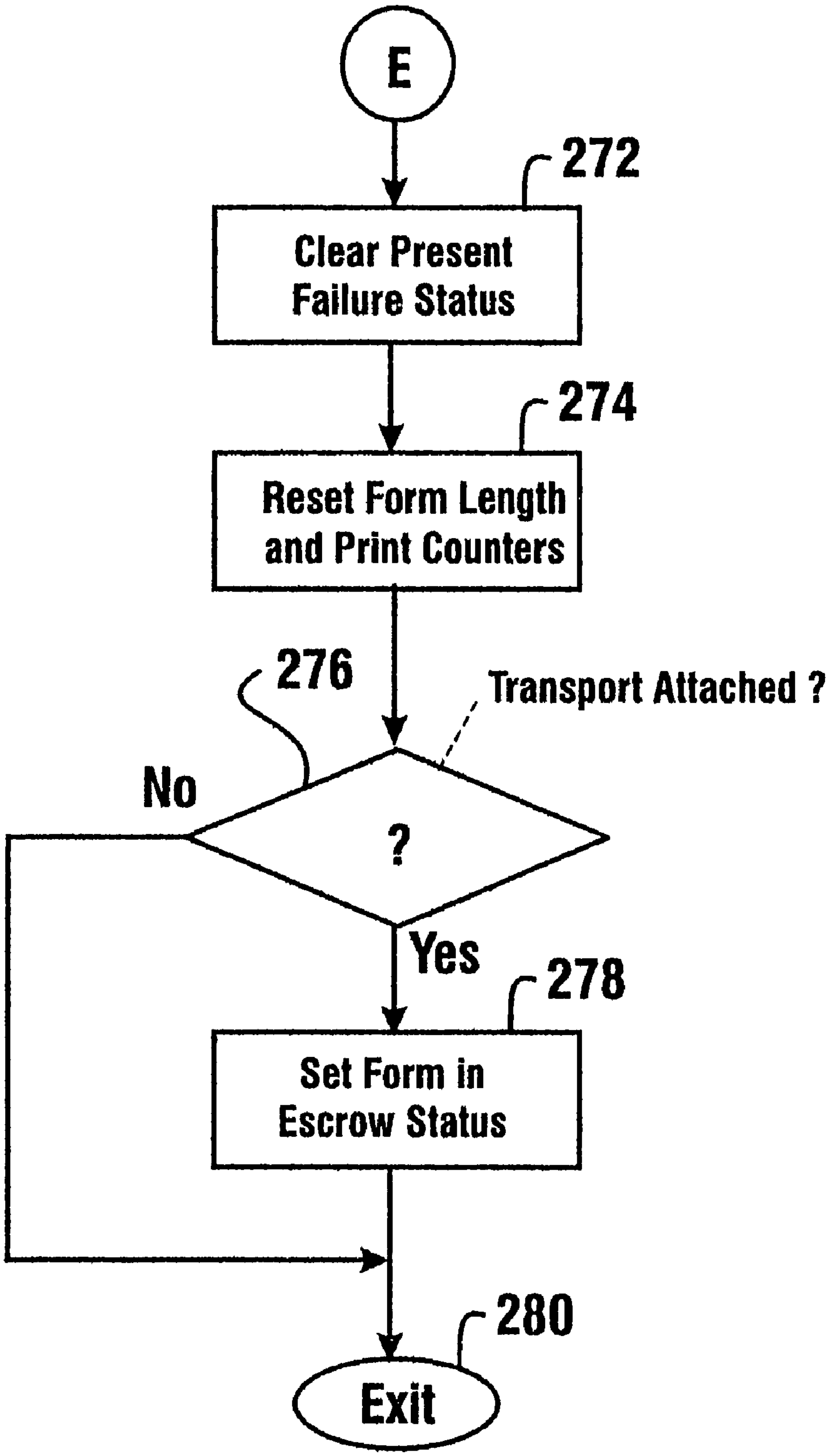

When the printing on the form is complete the controller is operative to execute the steps in the cut form routine represented in FIGS. 18 through 20. Thereafter the controller is operative to execute the steps in the present form routine shown in FIG. 21, which operates to present the form sheet out of the opening in the fascia to the customer.

The controller enters the cut form routine at a step 214. A determination is made at a step 216 if entry into the routine is erroneous because the form length based on the amount of printing is zero. If the form length is zero, the controller immediately exits the routine at a step 218. Assuming that the form length is not zero as determined at step 216, a determination is then made at a step 220 concerning whether the printed form length is above the minimum necessary for transport. Again this decision is based on the distance the printer has moved the form and conducted printing. If the decision made in the step 220 is that the form length is below the minimum, a step 222 is executed to advance the paper to the minimum form length.

From step 220 or step 222 the controller next executes a step 224 which involves making a determination of whether the transport is clear. If in step 224 the exit sensor 120 is sensing a form, a purge routine is executed at a step 226. The purge routine will generally remove the form at the exit and clear the transport. If however at a step 228 it is determined that the exit sensor is still not clear, a problem status is indicated at a step 230 and the controller exits the routine at a step 232.

If at step 224 no form is detected near the exit sensor or if the purge routine executed at step 226 is effective to clear the form, the controller executes a step 234. In step 234 the printer cuts the paper by actuating cutter mechanism 153. In addition, at step 234 the controller is also operative to update the top of form and paper reflectance threshold values stored in memory based on the reflectance characteristics of the particular form that has just been processed. This provides for updating the threshold values for each sheet and compensates for variations which occur among the sheets.

In step 234 the controller next proceeds to a step 236 at which a determination is made as to whether the transport is in the operative position. If so, the controller executes step 238 in which the transport moves forward so as to move a form of the minimum transportable length outward into the vicinity of the exit sensor 120. Alternatively, if the transport is found not be in operative position at step 236, the steps shown schematically in FIG. 20 are executed as later discussed.

From step 238 the controller executes a step 240. In step 240 a determination is made as to whether the paper is still being sensed adjacent to the entry sensor 110 in spite of the fact that the form should have been moved a distance sufficient to place it adjacent to the exit sensor. If the form is still adjacent to the entry sensor, a step 242 is executed in which the printer attempts to again cut the paper. From step 242 the transport again attempts to move the form towards the exit sensor in step 244. This time the advance of the form is attempted at middle speed.

The controller next executes a step 246. In step 246 a determination is again made as to whether the form is still adjacent to the entry sensor 110. If so, the controller executes a step 248 which indicates a failure status and exits the program at a step 250.

If however at step 240 or at step 246 the form is no longer sensed adjacent to the entry sensor, the controller executes a step 252 which clears any cutter failure status indication which may be in memory. The controller then operates the transport to advance the form towards the exit at high speed in step 254. In step 256 a determination is made as to whether the form is sensed adjacent the exit sensor 120. If so, the steps shown in FIG. 20 are executed.

If at step 256 the form is not sensed adjacent to the exit of the transport by sensor 120, a step 258 is executed. In step 258 the controller operates the transport so as to advance the form at high speed towards the exit. A determination is then made at a step 260 as to whether the form has reached the exit. If the form is now adjacent to the exit sensor the controller proceeds to the steps in FIG. 20. If however the form is not adjacent to the exit sensor the controller proceeds to a step 262.

In step 262 a jam-clear routine, sometimes referred to as a jam recovery routine, is executed. In the exemplary form of the jam recovery routine the controller is operative to move the belts 42 and 52 of the transport in a back and forth motion, first in one direction and then the other. In the exemplary form of the jam recovery routine the belts move in a first direction and then in an opposed direction from the initial starting point. This is done three times with the displacement of the belts in each direction increasing with each cycle. The back and forth movement of the belts in the jam recovery routine is generally operative to clear any jam and enable a stuck sheet to begin moving. The jam recovery routine may be used in a number of situations.

After executing the jam recovery routine the controller proceeds to a step 264 in which a determination is made as to whether the form was seen during the jam recovery routine adjacent to the exit sensor 120. If so, then the form has been freed and has likely been moved either out of the transport or into the storage location. In response to the form having been sensed at the exit sensor, a step 266 is executed in which any failure status indications are cleared and the controller proceeds to the steps in FIG. 20.

If, however, the jam recovery routine in step 262 was not sufficient to cause the form to be sensed by the exit sensor, then the controller is operative at step 268 to indicate a present failure status and the controller exits the program at a step 270.

From either step 236, step 256, step 260 or step 266 the controller proceeds as shown in FIG. 20 to a step 272. In step 272 any present failure status indications are cleared. The controller then executes step 274 in which the form length and print counters are reset. This enables the controller to begin calculating a form length for the next form to be printed. At step 276 a check is made as to whether the transport remains attached, and if so the controller moves to a step 278 in which it indicates that a form for a customer is now in escrow in the transport. Of course, if the transport is no longer attached then it is not appropriate to indicate that there is a form in escrow. Thereafter the controller exits the routine at a step 280.

Figure 21:
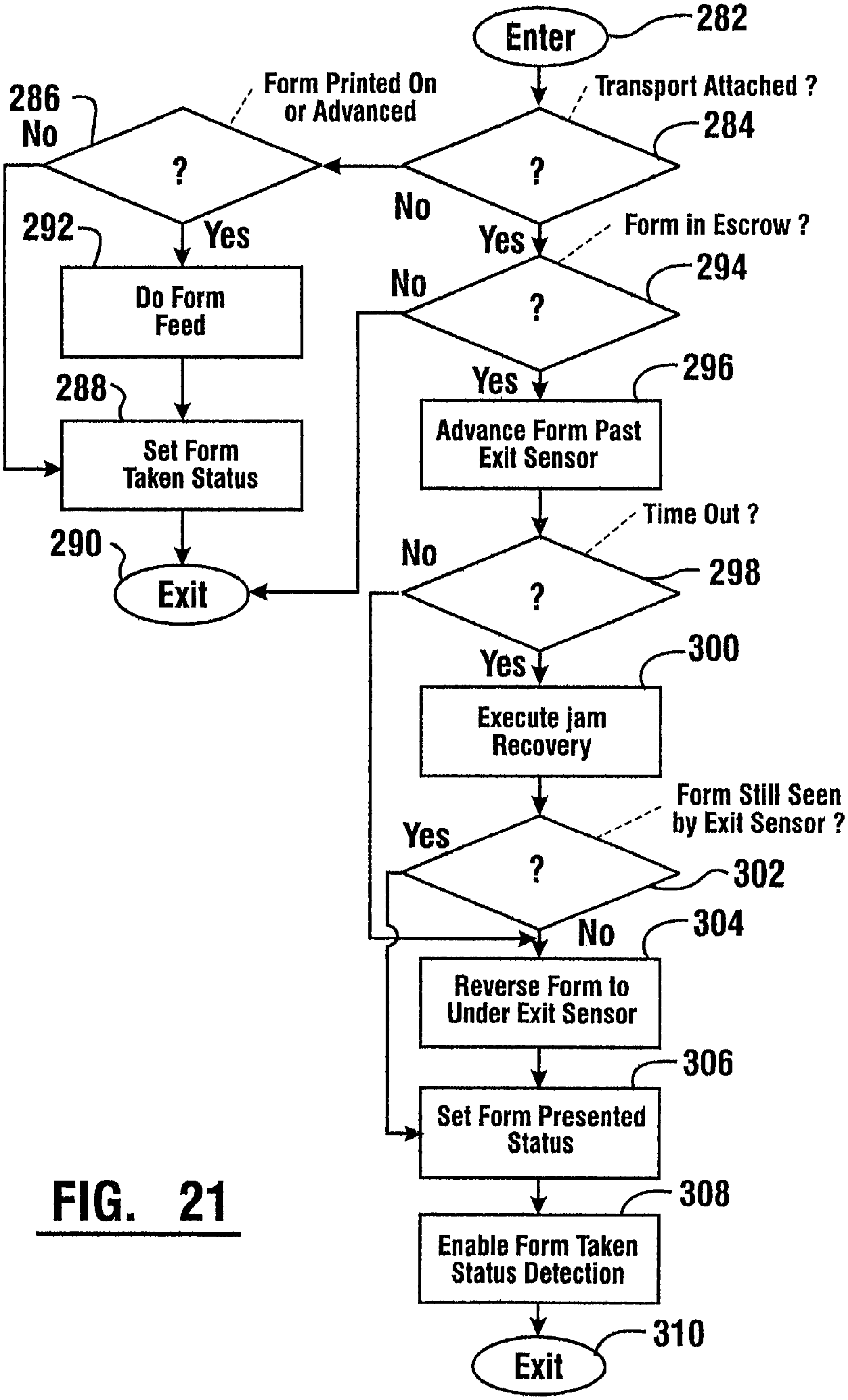
FIG. 21 is a schematic representation of steps executed by the controller in a present form routine.
Figure 22:
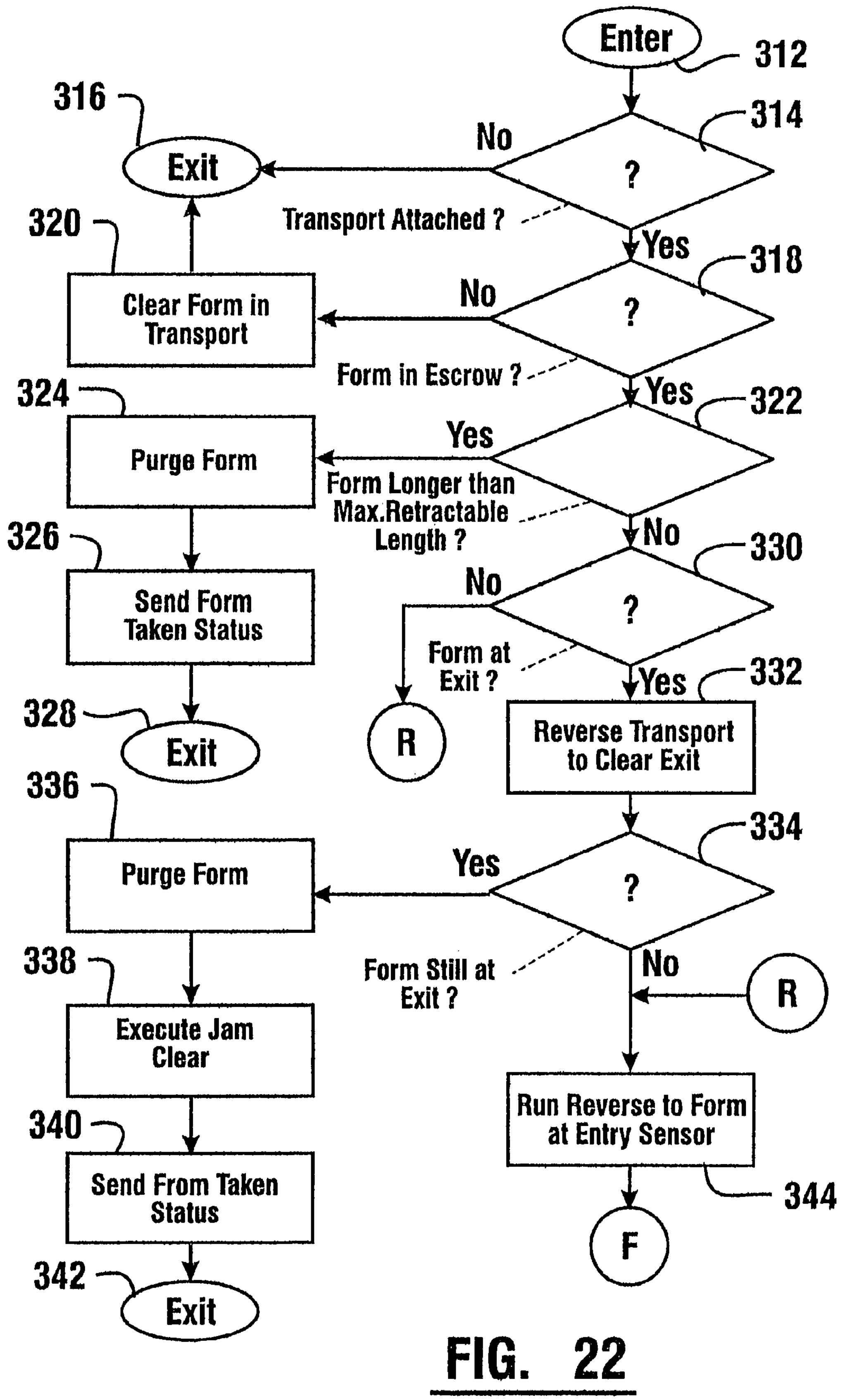
FIGS. 22 and 23 are a schematic representation of steps executed by the controller in a retract form routine.

Having placed the form in escrow in the transport the controller is operative to execute the present form routine schematically represented in FIG. 21. It should be understood that the presentation of printed forms is generally done one at a time. However, the exemplary embodiment enables the holding of more than one form in escrow in the transport if desired. This may be accomplished through appropriate programming which verifies a form as cut by moving it adjacent to the exit sensor 120 and then retracting it based on its length to an intermediate point in the transport pending the printing of additional forms.

When forms that are in escrow in the transport are to be presented, the controller executes the steps schematically indicated in FIG. 21. The controller begins by executing a step 282. From there a determination is made at a step 284 as to whether the transport is properly attached. If the transport is not attached a determination is made at a step 286 as to whether a form has been printed on or advanced. If not, the controller sets a form taken status at a step 288 and exits the program at a step 290. Likewise, if a form has been printed upon the controller executes a step 292 to feed the form. From step 292 the controller then proceeds through steps 288 and 290 to exit the program.

If in step 284 it is determined that the transport is attached the controller proceeds to a step 294. In step 294 a determination is made as to whether there is a status indicated in memory which represents that there is a form in escrow in the transport. If not, the controller exits the program. If however the proper status of a form being in escrow is indicated, the controller executes a step 296. In step 296 the controller operates the transport in an effort to move the form outward beyond the exit sensor 120.

While moving the form outward in step 296 an elapsed time is measured in a step 298. If the form is not sensed as having moved outward past the exit sensor within the elapsed time, then the jam recovery routine is executed at a step 300. The jam recovery routine is similar to that previously discussed in which the belts move cyclically back and forth in an effort to move the form.

After the jam recovery routine 300 a determination is made at a step 302 as to whether the form is still being sensed adjacent the exit sensor. If the jam recovery routine was successful and the form is now not being sensed by the exit sensor, or step 296 was successful in moving the form beyond the exit sensor, the transport is reversed by the controller at step 304 to place the form adjacent to the exit sensor for monitoring. The controller next executes a step 306 in which a status indication is given that the form is being presented. Step 306 is also executed in response to the form still being adjacent to the exit sensor at step 302.

After step 306 the controller is operative to execute a step 308. In step 308 the controller monitors whether the form has been taken by the customer. If the customer takes the form the form will be no longer detected by the exit sensor. Also, during step 308 the controller is operative to execute a timing routine. As previously discussed, if the form is present at the exit sensor longer than a time set in the programming of the controller, the form will be retracted in accordance with the steps described in connection with FIGS. 22 and 23. When the form is presented in monitoring step 308, the controller exits the routine through a step 310.

If in step 308 the customer takes the form, then a form taken status is indicated and the transport is ready to proceed to present the next form to either the same customer or a different customer. If however the customer fails to take the form within the time specified, the controller is operative to execute the steps represented by the retract routine graphically represented in FIGS. 22 and 23.

The controller enters the retract form routine beginning with a step 312. From step 312 a determination is made at a step 314 as to whether the transport is attached. If not, the controller exits the program at a step 316. If the transport is attached, the controller executes a step 318 in which a determination is made as to whether a status is indicated as the transport having a form in escrow. If at step 318 it is determined that the status indicative of a form being in escrow in the transport is no longer in memory, the controller operates to execute a step 320 in which the transport is run in reverse for sufficient time to retract any form that may be in the transport into the storage location, and then exits the routine.

If at step 318 the controller determines that there is a status indication that a form is in escrow in the transport, the controller moves to a step 322. In step 322 a determination is made concerning the length of the form that the printer has printed based on the line counters in the printer. The determination made in step 322 is whether the form is longer than the maximum length which can be retracted by the transport. It should be understood that in the exemplary embodiment the printer is enabled to print forms which extend from the printer all the way through the transport to the customer. Therefore it is possible to have a form which is longer than can be retracted.

Figure 24:
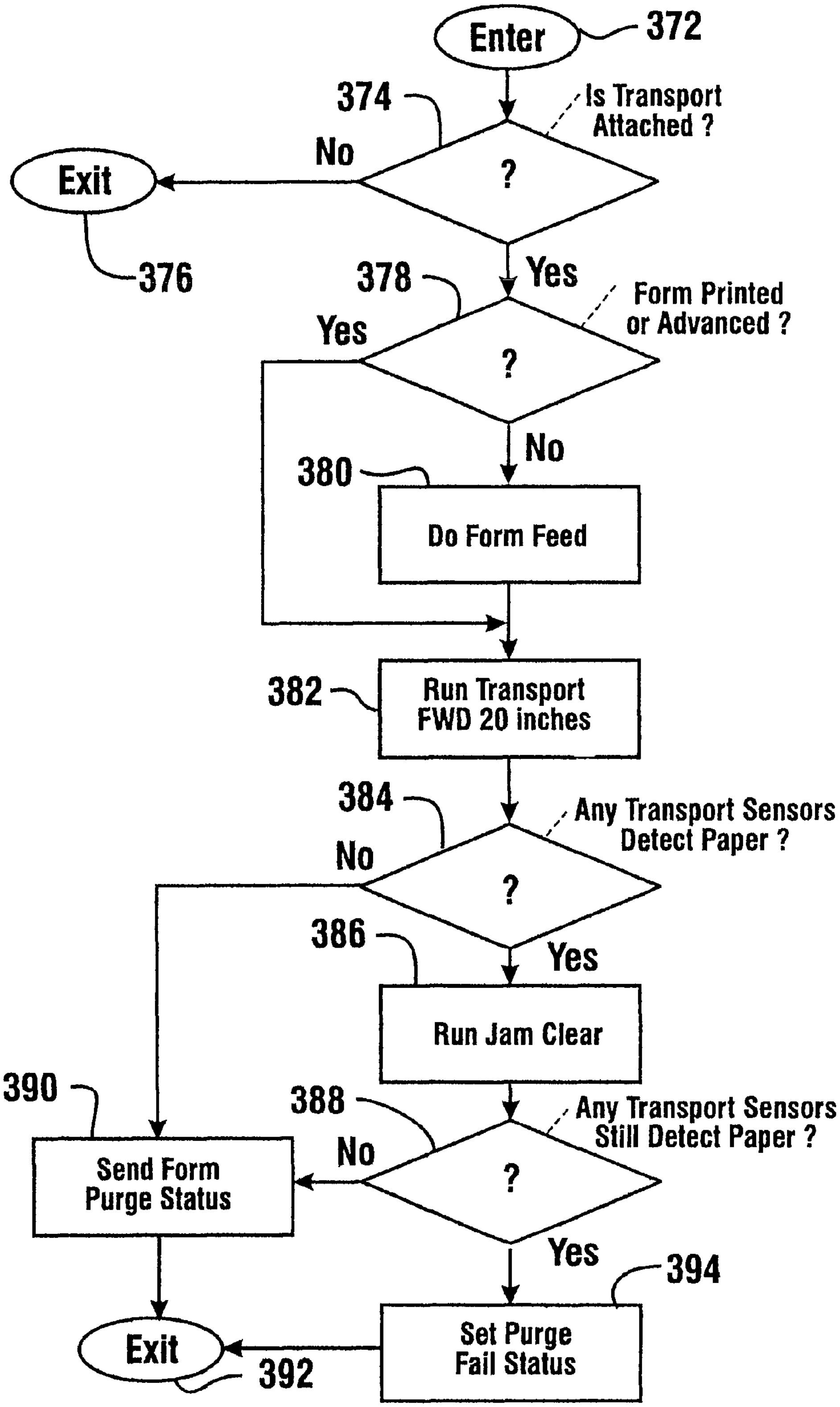
FIG. 24 is a schematic representation of steps executed by the controller in a purge form routine.

If at step 322 the form is determined to be longer than the maximum retractable length, a step 324 is executed by the controller. In step 324 the steps in the purge routine shown in FIG. 24 are carried out. After executing the purge routine the controller is operative to execute a step 326 in which the form status is indicated as taken, and the controller exits the routine at a step 328.

If in step 322 it is determined based on the length of form printed that the form in escrow is not too long to be retracted, the controller proceeds to a step 330. In step 330 a determination is made as to whether the form is currently adjacent to the exit sensor 120. If so, the controller executes a step 332 in which the transport is run in reverse to clear the exit sensor. After executing step 332, a step 334 is executed to determine if the form is still adjacent the exit. If so, the controller executes a purge form routine at a step 336. Thereafter the controller is operative to execute a jam recovery routine at a step 338. The controller then executes a step 340 to indicate that the form has been taken and exits the program at a step 342.

Figure 23:
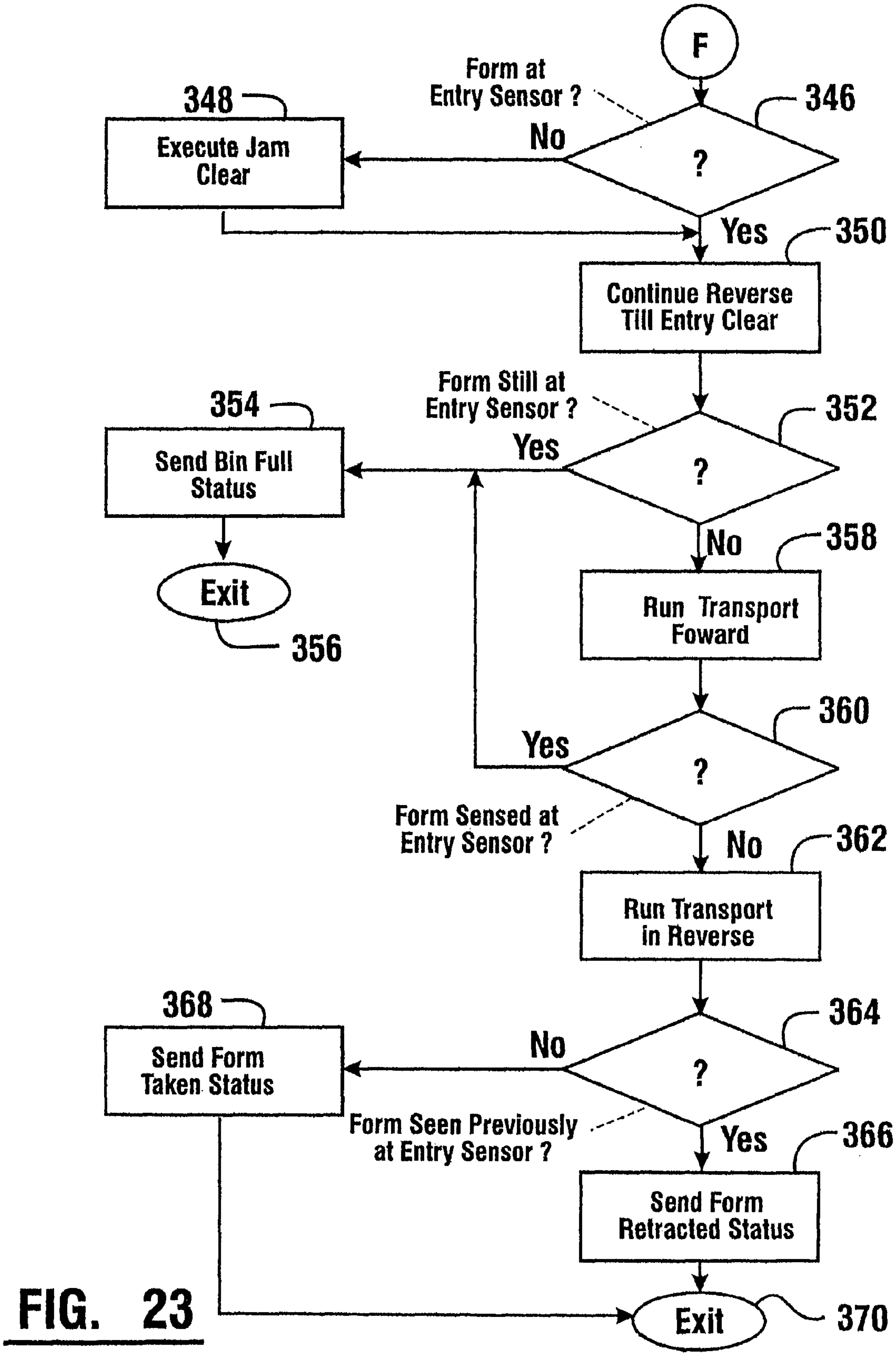

If at step 330 the form was found not to be adjacent to the exit sensor, the controller executes a step 344. In executing step 344 the controller is operative to run the transport in reverse until the form is sensed adjacent to the transport entry sensor 110. As shown in FIG. 23, a determination is made at a step 346 as to whether the form has moved adjacent to the entry sensor. If not, the controller is operative to operate a jam recovery routine at a step 348.

If the form is determined to be adjacent to the entry sensor at step 346 or after jam recovery routine 348, the controller is operative to execute a step 350. In step 350 the transport is continued to be run in a reverse direction until the entry sensor is clear. This indicates that the form has been retracted and directed by the gate member into the storage location 80. The controller next executes a step 352 in which a determination is made as to whether despite the operation of step 350 the form is still sensed adjacent to the entry sensor. If so, this is indicative that the storage location is full. An indication thereof is given by the controller through the execution of a step 354, and thereafter the controller exits the routine at a step 356.

If in step 352 the form is no longer sensed adjacent to the entry sensor this indicates that it has been likely properly retracted into the storage location. The controller next executes a step 358. In step 358 the controller is operative to run the transport forward a short distance and then stop. A step 360 is then executed in which a determination is made as to whether running the transport forward this short distance has pulled a form from the storage location which is sensed by the entry sensor. If so, this is indicative that the storage location is full and step 354 is executed.

If however in step 360 it is determined that the storage location is not full, a step 362 is executed. In step 362 the controller is operative to run the transport in reverse a distance similar to the distance that the transport was run forward in step 358.

The controller next executes a step 364. In step 364 a determination is made as to whether the form was seen by the entry sensor 110 during the course of conducting the retract routine. If so, a step 366 is executed in which a form retracted status is set by the controller. If however in step 364 it is determined that the form was not sensed by the entry sensor, then this is indicative that the customer took the form or that it was otherwise moved out of the transport. In response to this condition the controller is operative to execute a step 368 and to set a form taken status. From either steps 368 or 366 the controller exits the routine at a step 370.

The purge routine referred to in the discussion of the prior program steps is schematically represented in FIG. 24. The controller enters the routine through a step 372 and thereafter makes a determination in a step 374 as to whether the transport is attached to the printer. If the transport is not attached, the controller exits the routine in a step 376.

The controller next executes a step 378 in which a determination is made as to whether the printer has printed a form or a form has been advanced. If not, a form is advanced at a step 380. The controller is then operative at a step 382 to run the belts of the transport in a forward direction a distance sufficient to push any forms in the transport outward through the receipt opening 24. In an exemplary embodiment the distance that the belts are moved forward is about 20 inches.

After executing step 382 the controller next executes a step 384 in which a determination is made as to whether either of sensors 110 or 120 detect a form adjacent thereto. If so, a jam recovery routine is conducted at a step 386. The jam recovery routine is similar to that previously discussed in which the belts undergo an oscillating motion in an effort to clear a stuck form. After executing the jam recovery routine a determination is made at a step 388 as to whether a form is sensed adjacent to either of the sensors of the transport. If not, or alternatively if the transport sensors were clear at step 384, the controller is operative at a step 390 to set a form purged status indicative that the form has been pushed out of the receipt opening and that the transport is clear. The controller is thereafter operative to exit the program at a step 392. If however at step 388 it is determined that a form is still sensed adjacent to one of the transport sensors, then the controller is operative at a step 394 to set a purge fail status. The controller then exits the routine.

A further feature of the exemplary embodiment is that it avoids cutting of the paper when approaching the end of the paper supply. This is particularly helpful when a continuous roll of paper is used as the supply and the cutting of the paper after printing the "last" form will leave a short scrap of paper which cannot be handled by the printer or transport. Such a scrap piece of paper may jam the printer when new paper is fed.

Figure 17:
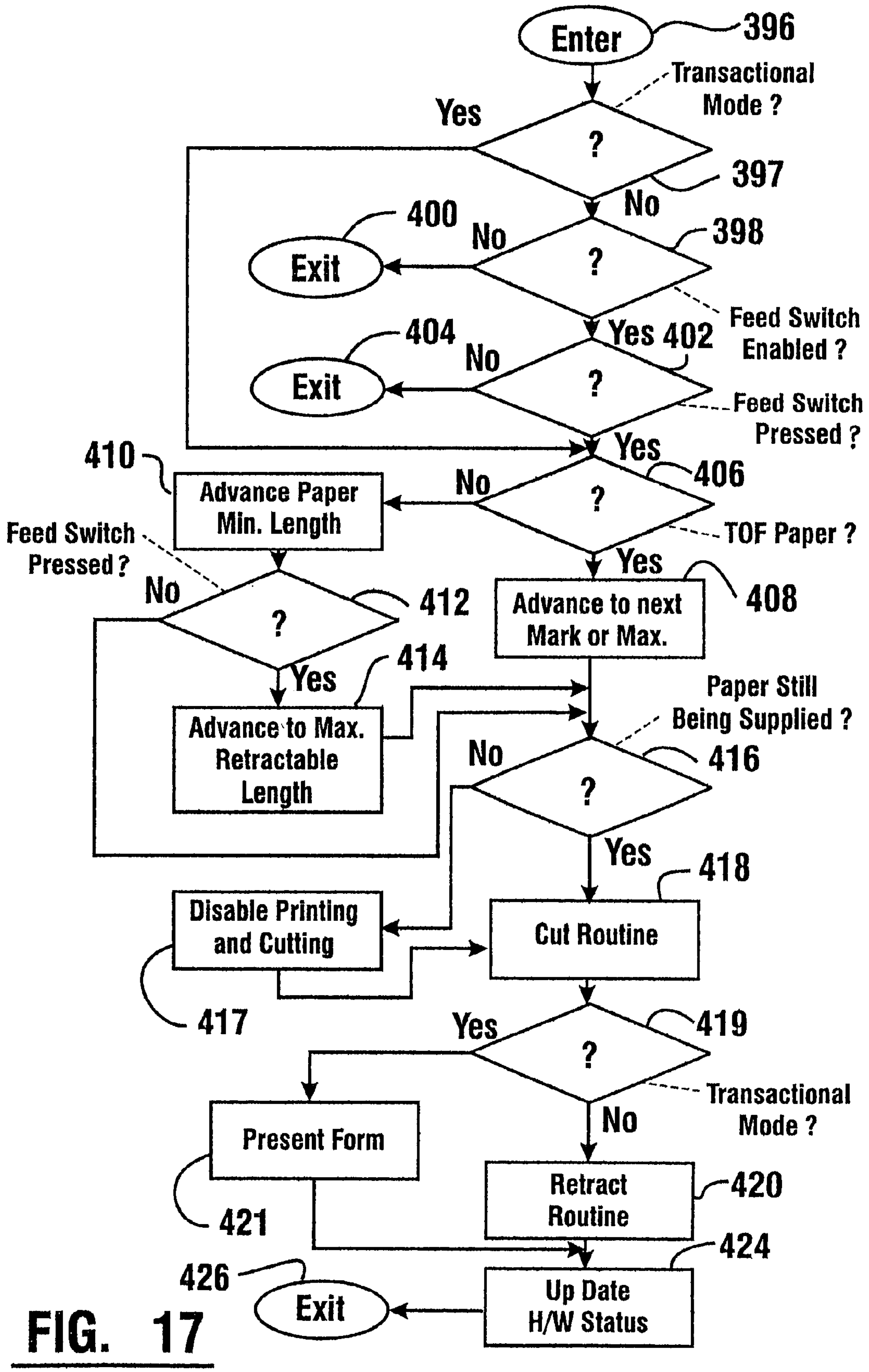
FIG. 17 is a schematic representation of steps executed by the controller in a paper form length control routine.

A form length control routine which is executed by the controller is schematically represented by the steps shown in FIG. 17. The form length control is operative in the processing of each form. This routine is critically involved when little paper is left and it is desired to install a new roll or supply. Alternatively, the routine may be used to test paper movement.

From an entry step 396 the controller proceeds to determine if the system is in a transactional mode or a service mode at a step 397. The setting of this mode is based on inputs or other conditions sensed by the controller. If the system is in service mode, the controller proceeds to determine if a feed switch is enabled at a step 398. The feed switch is a manual type switch that is enabled by the controller. For example, the controller may disable the feed switch in response to certain status conditions. If the feed switch is determined not to be enabled in step 398, the controller exits the routine at a step 400.

From step 400 the controller next executes a step 402 to determine if the feed switch has been manually pressed. This is done when test feeding paper or when unloading paper from an almost depleted supply so a new supply may be installed. If the switch has not been pressed the controller exits the routine at a step 404. If the feed switch was pressed the controller moves on to a step 406.

In step 406, which is reached from either step 397 or step 402, a determination is made as to whether the paper being used is TOF paper. As previously discussed, this can be based on an input by a user indicative that TOF paper is being used. Alternatively, this may be derived by moving the paper past the sensor 155 and sensing the periodic variations in reflectance associated with the presence of TOF marks.

If TOF paper is indicated at step 406 the paper is advanced at a step 408 to the next TOF mark or until the amount the paper advanced corresponds to a programmed maximum form length. However, if TOF paper is not indicated in step 406, the non-TOF paper is advanced in a step 410 an amount which corresponds to the minimum form length suitable for handling by the transport.

At a step 412 a determination is made whether the feed switch is being manually held. This is indicative that a servicer desires to unload the remaining paper. If the switch is being held the printer and transport advance the paper to the maximum paper length that can be retracted at a step 414.

From steps 408, 412 or 414 the controller proceeds to a step 416 wherein a determination is made as to whether paper is still being supplied. This determination is preferably made based on sensor 155 no longer sensing paper. Alternatively, the end of the paper may be sensed using the apparatus disclosed in U.S. Pat. No. 5,725,321, the disclosure of which is incorporated herein by reference. If paper is no longer being supplied, the cutting action of the cutter mechanism 153 associated with the printer 30 is disabled at a step 417.

From step 416 or 417 the controller proceeds to execute the cut routine in step 418. Of course if step 417 was executed, the paper is not actually cut during the cut routine. As a result all the paper remaining in the supply is moved through the printer and into the transport. In other cases the length of form pulled into the transport in step 418 will be the minimum form length or the maximum retractable form length.

From step 418 the controller determines if it is in transactional mode or service mode at a step 419. If the machine is in service mode, the controller executes a retract routine at a step 420. The retract routine is operative to retract the form into the storage location. If at step 419 the controller is in the transactional mode, the controller executes a present form routine at a step 421. The execution of this routine will generally result in delivery of the form to a customer. At a next step 422 the controller operates to update its internal status record. If for example, the paper is now out, a status indicative thereof is set. Likewise if a form was cut as a test, the status set indicates that the paper is loaded and the transport is ready. The controller then exits the routine at a step 426.

It should be understood that in the exemplary embodiment the paper cutting and printing activities are suspended whenever the paper is sensed as depleted. When paper is sensed as depleted, using sensor 155 in the printer or the system described in the incorporated patent disclosure, the remaining paper is sufficiently long to be moved by the printer transport mechanism through rolls 157, into engagement with the belts of the transport. The transport carries the last portion of the paper away from the printer. As a consequence, small pieces of paper which cannot be handled by the printer or transport are not produced at the end of a paper supply. This avoids problems associated with small pieces of paper that could jam the printer or cause it to malfunction.

In the embodiment shown the sensor 155 is enabled to provide a signal to the controller which indicates that it should cease further operation of the cutter. In this embodiment this result is achieved because the location in the paper path at which sensor 155 senses the paper is disposed a first distance in the paper path from the final drive rolls 157 which engage and move paper through the printer. This first distance is greater than a second distance that the paper must extend beyond the drive rolls 157 in the paper path to reach the delivery area from which the form sheets may be taken. In the preferred embodiment, the delivery area includes the nip 114 from which the transport may take the sheets. Of course, in other embodiments the delivery area may be an entrance to a different type of transport or an area in which a sheet may be manually engaged by a customer.

In the exemplary embodiment the cutter mechanism 153 is disposed in the paper path upstream from the rolls 157, so the rolls may solidly move the cut sheets to the delivery area. However, in alternative embodiments the cutter may be positioned on the downstream side of the final drive rolls 157. Likewise, in the exemplary embodiment the place where indicia are printed on the paper by the printer mechanism is positioned upstream in the paper path from both the cutter and the final drive rolls. However, different arrangements may be used in other embodiments. Likewise while sensor 155 is used to sense the presence of paper at a single location in the paper path, and the controller discontinues cutting operations as soon as the sensor no longer senses the paper, other embodiments may use other types of sensors and may delay the cessation of cutting activities until the paper has moved a further distance beyond the condition where the end of the paper supply is sensed. This will depend on the system configuration, the ability to calculate the distance the paper moves and the amount of paper remaining when the end of the paper is sensed. Those skilled in the art will devise other embodiments which employ the fundamental aspects of avoiding production of a form sheet which is too short to extend from the drive to the delivery area based on the disclosure herein.

It will be appreciated by those skilled in the art that variations of the above-described steps may be executed in efforts to clear jams and purge the transport. It will be further understood that although the controller 112 is described as adjusting threshold levels for detection of paper at the entry sensor 155, corresponding threshold levels for detecting paper at the transport sensors 110 and 120 may similarly be adjusted. This may be done either through the process of sensing successive areas on a sheet with sensor 110 or 120 in a manner similar to that described with reference to sensor 155, or by adjusting threshold levels for one or both sensors 110 and 120 in accordance with the paper characteristics as determined using sensor 155.

Another exemplary embodiment is directed to minimizing reporting of nuisance path blockage errors while ensuring legitimate path blockage conditions receive prompt attention. These path blockage errors may be the result of a jam associated with a sheet to be dispensed, such as receipt. In an exemplary operation, an initially sensed receipt jam condition is not reported. The generation of a jam indication is delayed or postponed until verification or confirmation of a sustained jam. The detection of at least two consecutive receipt jam event indications may first be required prior to generation of a receipt jam report. The delay allows a consumer or other event to clear the initial jam before the machine controller operates to declare an unremovable jam and a fault condition requiring intervention by a servicer or other entity.

As previously discussed, sensors 110 and 120 are operatively connected to a controller 112 which includes at least one processor. The sensors are adjacent a receipt outlet transport path. The receipt transport path extends toward a user accessible outlet 118. The sensors are each operative to sense a receipt adjacent thereto. The sensor 120 is at the exit end of the receipt outlet path. The controller is operative responsive to its associated programming to determine an indication of a receipt jam event responsive to signals from the sensors. The controller is operative to perform a test or check after receiving an initial jam indication. The test can be conducted prior to generating an actual malfunction signal. The controller can be programmed to implement a jam annunciation delay routine to attempt to clear an indicated receipt jam. This exemplary jam annunciation delay routine uses at least one further receipt to confirm the indicated receipt jam.

A (first) receipt may become jammed in a receipt outlet path due to its failure to reach the user accessible outlet 118. Alternatively or in addition, even if the first receipt was able to reach the outlet it may still become jammed due to its failure to be properly retracted from the outlet. As previously discussed, if a customer fails to take a presented receipt within a specified time then the controller is operative to execute a retract routine. Thus, a receipt may become jammed during retraction or as a result of inability to be retracted.

If the controller determines an indication of a receipt jam in the transport path, then the controller is operative to execute the jam annunciation delay routine involving a second receipt. The controller delays annunciation of a receipt jam status until an attempt is made to deliver another (second) receipt through the outlet 118. The second receipt can be associated with or without a user operating the machine. For example, the second receipt may be another receipt for the same user for the same or different transaction, a receipt for a subsequent user related to a subsequent transaction, or a dummy test receipt previously stored in or generated by the machine. If the second receipt is determined as having been prevented from reaching or passing out of the outlet to a user then a persistent jam has been verified. The controller can then generate one or more outputs which comprises a receipt jam signal. In an exemplary embodiment the controller detects "n" consecutive receipt jam event indications (e.g., two) involving "n" receipts (e.g., two), prior to generating a receipt jam signal.

An exemplary example of the jam recovery operation will now be discussed. A (first) receipt is printed through operation of a printing device in the machine responsive to the controller. Generally the first receipt will be carried out responsive to a transaction that has been conducted for a user through operation of the machine. This first receipt may be any printed receipt and is not necessarily the first printed receipt from a new paper supply or roll. Subsequent to the printing, the controller attempts to transport the first receipt along the receipt transport path toward the outlet, and if not taken by a user then transport the first receipt by retraction as previously discussed. The controller, via the sensors, determines whether the first receipt was properly transported, e.g., reached the area adjacent the outlet and was taken or was retracted. If the first receipt failed to reach the outlet, or reached the outlet but was not taken or failed to be retracted, then the controller responsive to its programming determines an indication of a receipt jam event associated with the first receipt. Of course the controller at this point may implement the previously discussed jam recovery routine in an attempt to free the indicated receipt jam. The determining of a first receipt jam may or may not include a jam recovery routine. Upon the controller ascertaining or determining that there is a jam associated with the first receipt, the controller preferably does not immediately generate a receipt jam signal (which may relate to placing the machine wholly or partially out of service, implementing a service call, etc.). Rather, the controller implements a jam annunciation delay routine involving another (second) receipt.

In a jam annunciation delay routine the controller attempts to transport the second receipt along the receipt transport path toward the outlet. The second receipt may be for example, a receipt associated with another transaction or a dummy receipt that is printed by the machine. The controller, responsive to the sensors, determines whether the second receipt (or a receipt, i.e., the first receipt) successfully reached the outlet. If the second receipt failed to reach the outlet or is not sensed as having been taken from the outlet, such as due to blockage by the first receipt, then the controller determines an indication of a receipt jam event associated with the second receipt. Responsive to the second receipt failing to reach and/or pass from the outlet a receipt jam signal is generated by the controller. A receipt jam event may be associated with the second receipt without the second receipt being jammed and immobile in the transport. The delay routine may be programmed to retract the second receipt away from the outlet opening prior to issuing the receipt jam signal. The retraction of the second receipt may or may not be successful.

Thus, in the exemplary method of operation the controller generates a receipt jam signal responsive to both detecting an indication of a receipt jam event associated with the first receipt and detecting an indication of a receipt jam event associated with the second receipt. Thus, the machine may be placed in or give notice of a fault condition. For example, the machine may display a user message that a transaction may be requested but that no receipt will be provided; the machine may be placed out of service; a machine generated service call may be implemented; etc.

If the controller determines that the second receipt successfully reached and/or was taken from the outlet, then this is an indication that the receipt transport path to the outlet has been cleared of the indicated first receipt jam. It should be understood that in some embodiments the controller can determine that the second receipt successfully reached the outlet even though it may actually be the first receipt that reached the outlet. Alternatively, the first or second receipt may be what is sensed as adjacent the outlet but not taken by a user within a time period so as to clear the sensor. For example, transport of the second receipt may free the first receipt to first reach the outlet and be sensed. Nevertheless, the prearranged delay in jam annunciation can enable an indicated jam to be cleared without having to submit a receipt jam signal or error notice. The delay allows a machine user (e.g., a customer) or the transport mechanism of the second receipt a chance to clear the initial indicated jam of the first receipt before a machine fault condition is implemented. With the indicated jam having not been confirmed by the successful transport and delivery of the second receipt, the status of the receipt dispensing capability is considered normal and no receipt jam signal need be generated. The machine need not be declared out of service. Thus, the machine is determined to be operational to print and dispense the next needed receipt.

It should be understood that the second receipt may be the next immediate receipt generated by the machine following the first receipt. That is, the single first receipt and the single second receipt together may comprise two consecutive or sequential (printed) receipts. Such receipts can be associated with two successive transactions conducted with the machine. Alternatively, the second receipt can be from the same transaction that is associated with the receipt that did not reach the user. For example, in some embodiments the controller may operate to paint a second receipt with the same information and to make the second receipt longer so greater force is applied to moving the receipt.

It should also be understood that a generation of a receipt jam signal is not limited to use of two receipts, but more than two receipts may be used. That is, a receipt jam signal may be responsive to the determination of at least two consecutive receipt jam event indications involving at least two receipts. For example, a jam annunciation delay routine may involve three consecutive receipts. That is, if it is determined that the second receipt failed to reach the outlet then a third receipt can be directed toward the outlet. If the controller determines that the third receipt successfully reached the outlet then a receipt jam signal is not generated. Thus, a jam annunciation delay routine may be programmed to detect "n" consecutive indications of a receipt jam event, wherein each respective indication is associated with a respective different receipt. The detection may involve "n" consecutive receipts, where "n" is an integer greater than or equal to the numeral two. For example, the delay routine may involve "n" consecutive receipt jam indications until n reaches a programmed value "k," where k=2, 3, or 4, etc. The value of k is set to the number of desired receipt jam indications. That is, k is set to the number of tests to be performed before a jam is confirmed. After the $n^{th}$ consecutive indication of a receipt jam, where each indication is based on a different ($n^{th}$) consecutive receipt, a receipt jam signal reflective of a receipt jam can be generated.

Figure 25:
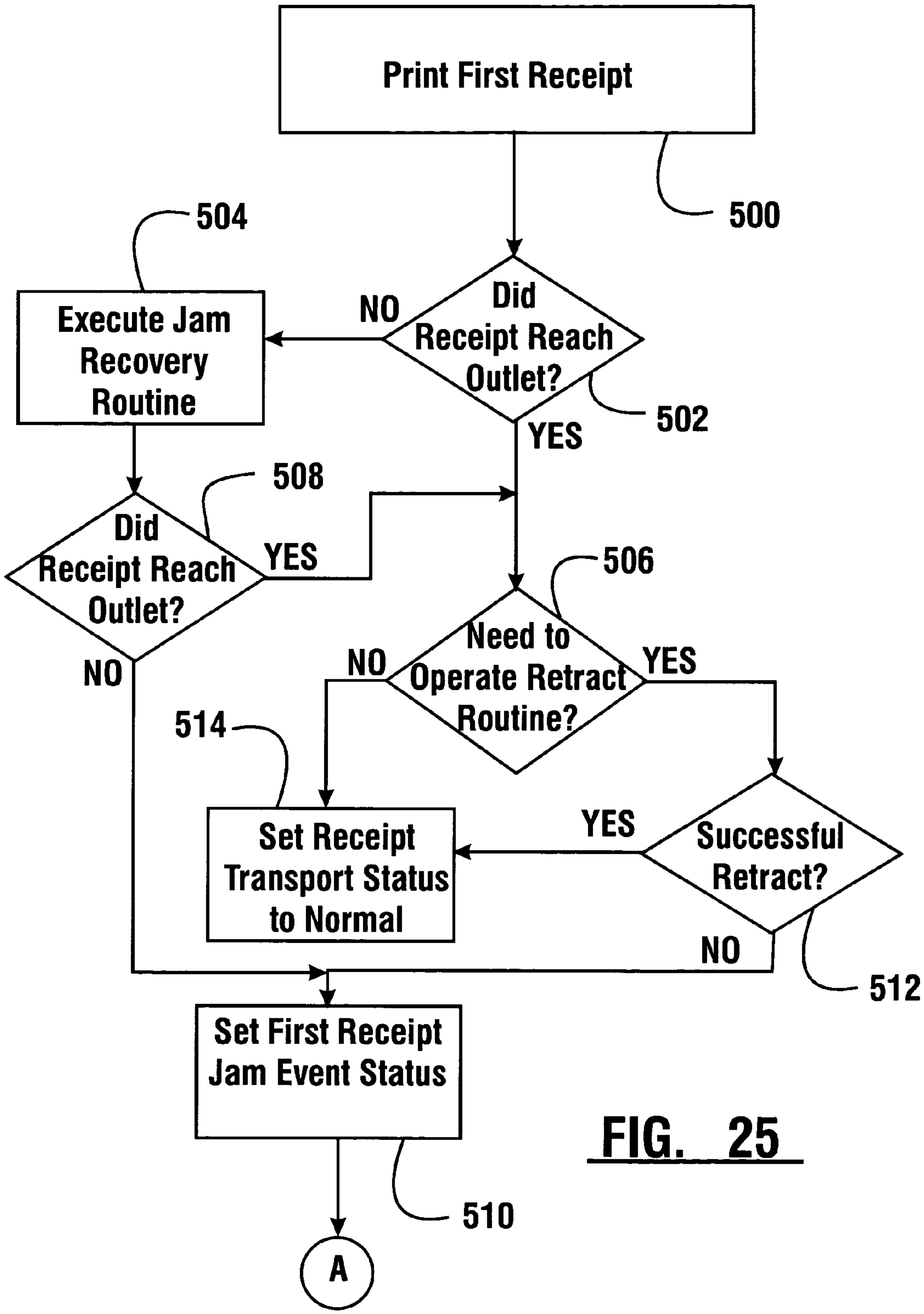
FIG. 25 is a schematic representation of steps in a determining a jam event indication.

As previously discussed, a receipt jam event indication can be detected by the controller in operative connection with the sensors. FIG. 25 shows an example of steps which the controller is operative to execute resulting in a determination of a jam event indication. FIG. 25 also show steps involving the previously discussed jam recovery routine and retract routine. It should be understood that steps different than those shown in FIG. 25 may be performed in determining a receipt jam event indication. Once a receipt jam event is indicated then a jam annunciation delay routine can be implemented.

Figure 26:
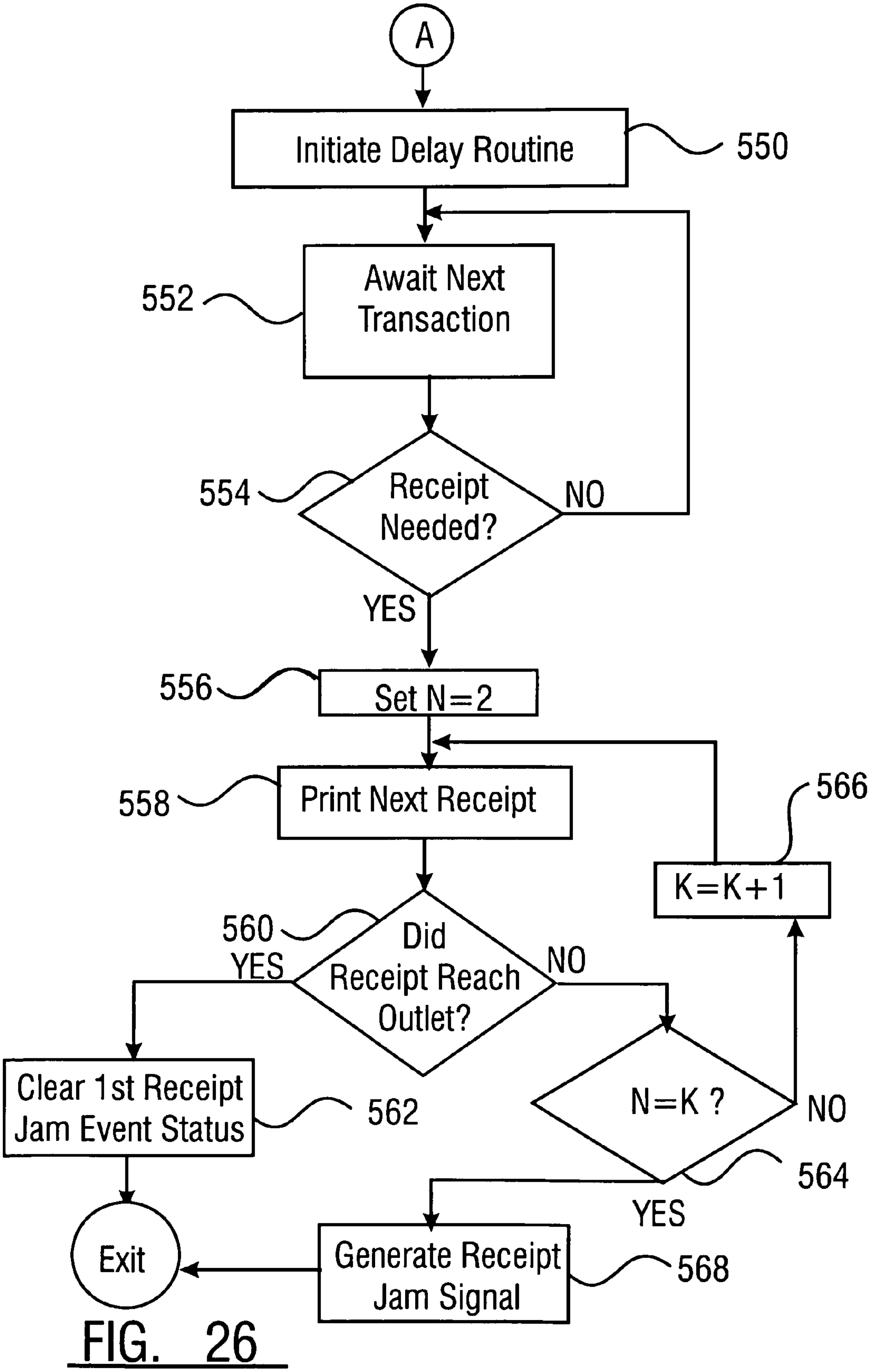
FIG. 26 is a schematic representation of steps in a jam annunciation delay routine.

FIG. 26 shows an example of steps which the controller is operative to execute in implementing the jam annunciation delay routine.

As shown in FIG. 25 a user has conducted a transaction through operation of the machine, such as a cash dispensing transaction, and a user's transaction receipt is printed at step 500. Of course in some embodiments, a dummy test receipt (printed or pre-printed) may be used in place of a user's receipt. At step 502 a determination is made as to whether the receipt reached the user accessible outlet. If not, then the controller can initiate a jam recovery routine at step 504. Alternatively, if the receipt successfully reached the outlet and was taken by a user within the time period programmed in connection with the timer function of the controller, then the controller proceeds to step 506.

If the jam recovery routine is unsuccessful to remove the apparent jam, as determined by whether the receipt reached the outlet in step 508, then a receipt jam event status is set by the controller in step 510.

If the receipt reached the outlet in either of steps 502 or 508 then the controller determines whether a retract routine needs to be implemented in step 506. For example, if the user does not take the receipt within a predetermined time period then the retract routine needs to be implemented and the controller proceeds to the determination of step 506. If the receipt was successfully retracted for storage in step 512, or if the retract routine need not be implemented in step 506, then the controller sets the receipt transport status to normal in step 514. However, if the receipt was not successfully retracted in step 512 then a receipt jam event status is set by the controller in step 510. With a receipt jam event indicated, the controller is programmed to implement the jam annunciation delay routine instead of immediately generating a jam receipt signal.

As shown in FIG. 26 the jam annunciation delay routine is implemented in step 550. The delay routine waits for the next transaction as shown in step 552. During this delay a user may be able to unjam the first receipt. Of course it should be understood that in alternative embodiments the controller may be operative to immediately print and attempt to deliver another receipt for the first transaction.

Continuing with the logic flow in FIG. 26, in step 554 the controller determines whether a receipt is needed for the second transaction. If not then the controller awaits another transaction in step 552. Alternatively, if a receipt is needed then the initial number (N) of receipts involved in the jam confirmation test is set to the numeral two in step 556.

The next ($N^{th}$) receipt involved in the jam is printed in step 558. In step 560 the controller determines whether any receipt reached the outlet and was taken within the set time period. If a receipt reached the outlet then the receipt jam event status is cleared in step 562 and the routine is exited. Alternatively, if a receipt did not reach the outlet and was subsequently cleared, then N is compared to K in step 564, where K is the predetermined maximum number of receipts involved in the jam test.

If N does not equal K then N is increased by an incremental value (i.e., one) in step 566. However, if N equals K then the delay was not successful to dislodge the jam. Thus, the controller proceeds to step 568 to cause generation of a receipt jam signal and the routine is exited. It should be understood that in alternative embodiments steps different than those shown in FIG. 26 may be performed in carrying out a delay routine.

As previously discussed, the receipts (e.g., first and second receipts) involved in determining the jam event indications can be printed user receipts. However, the receipts used may also be receipts not associated with a user. For example, one or more of the receipts may be a dummy receipt. One or more dummy test receipts may be previously stored in the machine, or generated by the machine subsequent to indication of a first receipt jam event. For example, each first receipt and/or the second receipt may comprise a dummy receipt.

The automated banking machine may comprise an ATM. ATMs may be used by individuals to receive cash from their accounts, to pay bills, to transfer cash between accounts, and to make deposits. The ATM may include a cash dispenser and other known transaction function devices for use in performing transactions. A cash dispenser may be operative to dispense an amount of cash requested by a user in a cash withdrawal transaction. The ATM may be operative to print indicia associated with or corresponding to a transaction. The ATM may be operative to print indicia associated with or corresponding to the amount of a cash withdrawal on a user's receipt, such as the first receipt and/or the second receipt.

In other embodiments an automated banking machine may be used to detect and/or prevent vandalism or other malicious actions. For example, certain types of vandalism may occur in the form of delivery path blockage. Such blockage may cause failure of a sheet, e.g., a currency sheet, mini statement, or receipt, to reach a machine user. Pattern recognition may be used to narrow acts of vandalism to a specific user. Alternatively, users may be identified who may have information concerning circumstances related to machine tampering. An individual ATM can be connected in an ATM network in which all of the ATMs share a central host. The host computer may be used to associate ATM error signals or other signals indicative of possible tampering (e.g., receipt jam signals) with a specific ATM user. Each ATM in the network may operate an error association routine for use in gathering user identity information for the host, or alternatively data stored at each ATM or centrally may be analyzed for purposes of identifying individuals or circumstances involved in or who may have information relating to ATM tampering.

The ATM may include a card reader operative to read indicia corresponding to a user or a user's account information from a user's card. The card may be a bank card, credit card, debit card, gas card, merchant card, smart card, or other medium that is operative to store account data and/or other information which may be used to identify a user or their accounts. In alternative embodiments the ATM may include a biometric type reading device which may identify the ATM user by a characteristic thereof. Such biometric reading devices may include for example a fingerprint reader, iris scanner, retina scanner, voice recognition device, facial recognition reader, or other device. The identity of a user can be used to verify that the user is authorized to use the ATM. Thus, in the error association routine the identity of an ATM user may be obtained and stored in one or more data stores for analysis purposes.

An ATM controller is operative to execute the error association routine in the ATM. The ATM in the error association routine can link or associate a predetermined number of selected users to an error signal. Data representative of the identity of selected users can then be stored in a multi-machine data store at the host computer or other computer with other selected user data associated with other respective error signals. The other selected user data may have been determined from other ATMs. That is, the multi-machine data store may include data from a plurality of ATMs, each operating an error association routine.

The number of users selected for association with an error signal can be predetermined. The number chosen may small (e.g., one) or large (e.g., thousands), and may be based on the amount of memory available. In an exemplary embodiment a certain number of consecutive users immediately prior to and current with the generation of the error signal may be selected. For example, if the routine is set to store data on three users then the current ATM user (user during the error signal) and the previous two users (prior to the error signal) may be selected. If there is not a current user (e.g., error signal generated without a user transaction) then the last three users may be the selected users. Of course this approach is exemplary.

Alternatively, users may be selected based on a set time period prior to the error signal. The time period may be minutes or hours. For example, the selected users may be the current user and all previous users within fifteen minutes prior to the error signal. Further alternatively, a combination of both a predetermined number and a set time period may be used for user selection. For example, the ATM may have a default minimum storage of two users and a maximum storage of all users within one hour of the error signal. That is, if there were more than two (e.g., ten) users within an hour then each of these users' identity would be stored. However, if the were no users within the hour then information concerning the last two previous users would remain stored. The factors relating to the set predetermined time period for a particular ATM may include the amount of traffic or usage that particular ATM receives.

The exemplary ATM is operative to create a temporarily memory file of ATM users. Data identifying each ATM user would be included for a time in the storage file in order to be able to retrace the users previous to the error signal. The memory file may be a first in first out (FIFO) type of storage file. For example, if the predetermined number of users in an exemplary embodiment is set at three, then the temporarily file can hold respective data representative of only three identified users. The user data may be stored consecutively. Therefore, the next (fourth) ATM user replaces the first (oldest) stored user in the file. That is, the file changes from storing the data of users one, two, and three, to storing the data of users two, three, and four.

Upon the generation of an error signal, such as a receipt jam signal, the ATM may be operative to send the data corresponding to selected users or their respective transactions (or files or list) to a central computer associated with plural ATMs, e.g., a host computer. The host computer may be operative to receive new user data from the individual ATMs and store it in one or more associated data stores. The host computer is operative to oversee the multi-machine data store, which comprises a plurality of received individual ATM selected user files or lists. The host computer is also operative to compare newly received user data with the user data already stored in the multi-machine data file for matches. The exemplary host computer is further operative to add the newly received user data to the multi-machine data file. The host computer may additionally be operative to modify, rearrange, or add to the received user data.

For example, if the predetermined number of selected users was set at three for an ATM, then the host computer can compare or otherwise analyze the received data corresponding to the three selected users with the multi-machine data file having a complete list of previously selected users associated with other error signals. The analysis may include comparing data representative of account information or data representative of biometric data. If any of the three newly received selected users matches a previously selected user stored in the multi-machine data file, then that specific user can be uniquely identified as a potential ATM tamperer.

Figure 27:
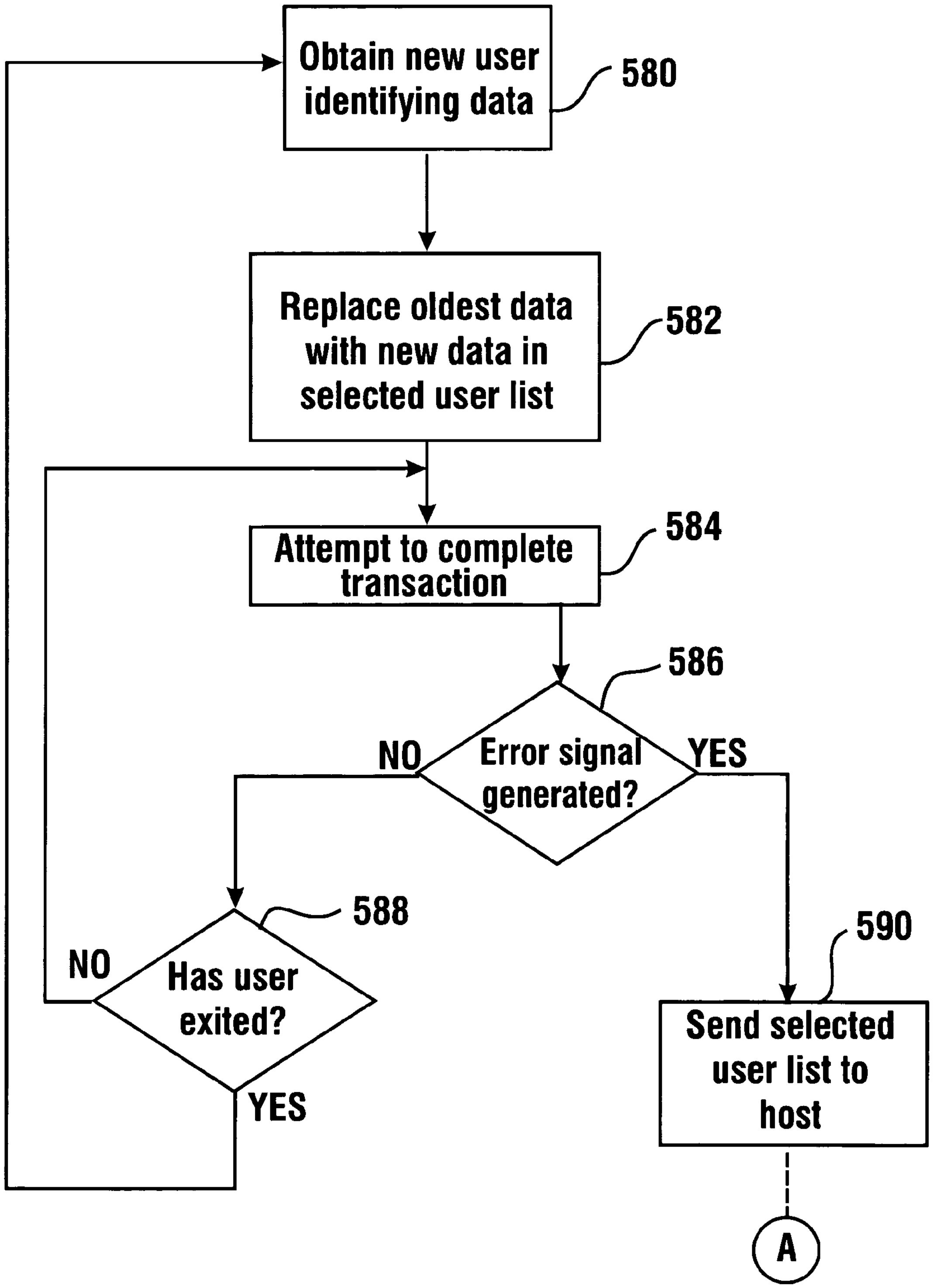
FIG. 27 is a schematic representation of steps in an error association routine.

FIG. 27 shows an example of steps which may be executed in implementing an error association routine an ATM.

Figure 28:
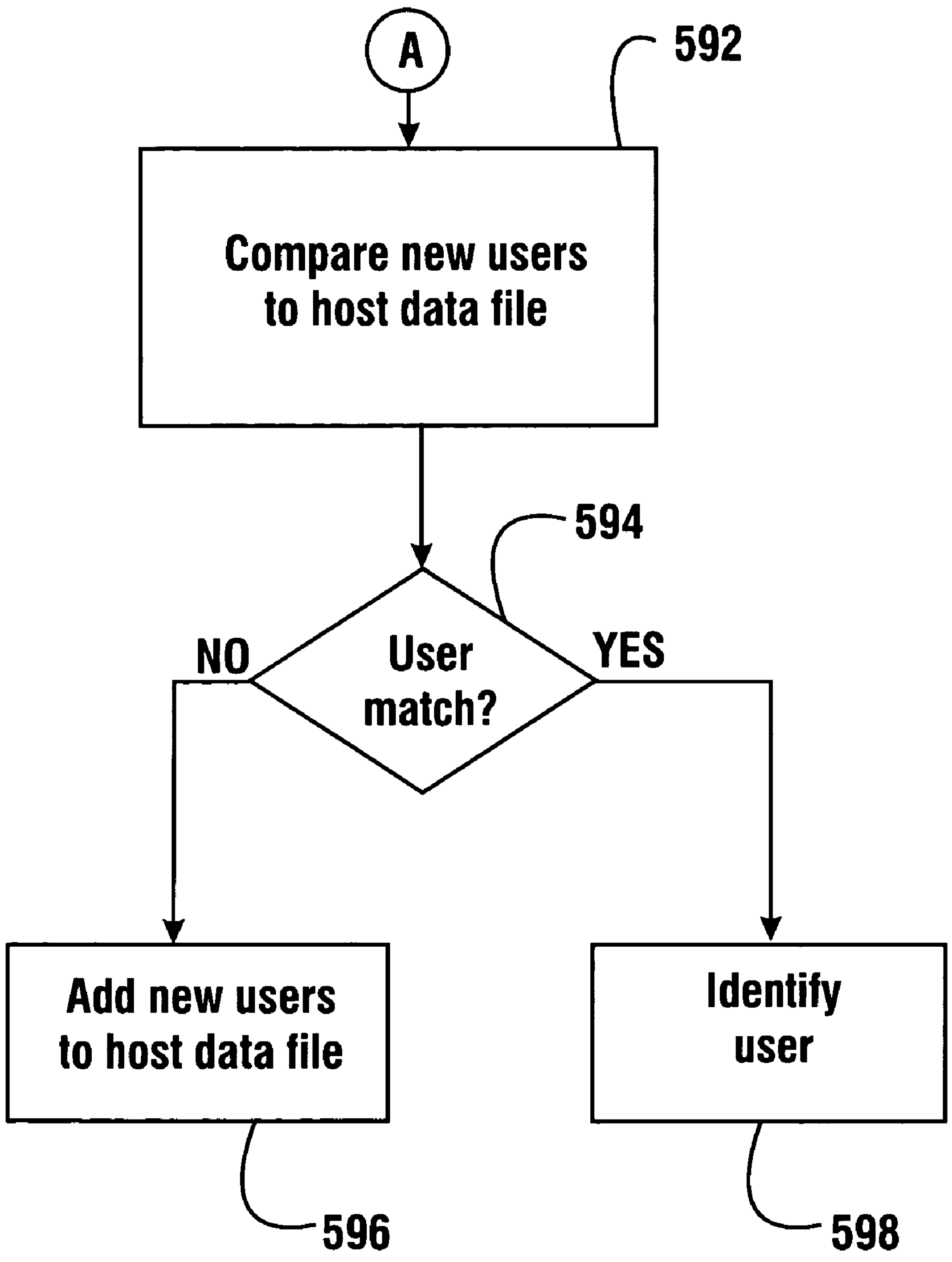
FIG. 28 is a schematic representation of steps in comparing user data.

FIG. 28 shows an example of steps which may be executed at a host computer in comparing user data.

As shown in FIG. 27, the controller performs step 580 to obtain new user identifying data. At step 582 the oldest data entry is replaced with the new data in the selected user list. At step 584 the ATM attempts to complete the user's requested transaction. At step 586 a determination is made as to whether an error signal was generated.

If no error signal was determined in step 586, then at step 588 a determination is made as to whether the user has exited the ATM or whether the user requests another transaction. If the user requests another transaction then the controller returns to step 584. Alternatively, if the user has finished the ATM session, then the controller returns to step 580 to await the next user.

If an error signal was determined in step 586, then at step 590 the controller sends the current data in the selected user list to the host computer.

As shown in FIG. 28, the host computer performs step 592 to compare the newly received user data with the user data already stored in the multi-machine data file. At step 594 a determination is made as to whether there is a user data match (or substantial conformance). If there is no match, then the new user data is added to the multi-machine data file in step 596. However, if there is a match, then the user can be identified in step 598.

It should also be understood that an error association routine is not limited to only users which perform machine transactions. That is, vandalism may be caused by a non-user of an automated banking machine. The non-user may be unidentified or unknown. Therefore, an ATM may be configured with one or more biometric reading devices operative to capture identifying features of a non-user of the ATM. For example, image data of a portion of a person adjacent to the ATM may be captured for analysis. A facial imaging device may be used, for example, in an attempt to capture a identifiable features of a potential perpetrator. The ATM may include one or more proximity sensors (e.g., weight sensors, heat sensors, sonic sensors, motion detectors, etc.). The proximity sensors may be operative to trigger an operation of an imaging device. For example, one or more images (or a video recording) may be taken of an exterior area adjacent an ATM fascia when an individual (user or non-user) becomes and/or is within two feet of the ATM fascia.

The facial features of a non-user may be stored as an entry in the ATM's selected data store (or multiple data stores) in a format such as an image file. Thus, identity features of a non-user may be obtained and stored in memory for comparison purposes. If a match is later made using the host computer then a process of actually identifying the (unknown) matched non-user may be undertaken.

If the ATM determines that the non-user becomes a user by conducting a transaction, then the ATM may be able to substitute the known user identifying data such as data read in response to a user input for the captured image data. For example, if the ATM determines that the individual at the fascia proceeds to use the machine within a set time period, then the ATM can determine that the individual is a user and not a non-user.

Alternatively, the selected data file may include two different entries per individual. For example, the selected data file may include an entry for image data and an entry for identifying data based on user input. For a user the selected data file may include both an image data entry and known identifying data entry (e.g., account data). For a non-user the selected data file may include an image data entry and an empty identifying data entry (or an entry reflective of a non-user). Furthermore, users and non-users may have their own selected data files. The host computer may be operative to recognize and process different types of selected data files received from individual ATMs. Of course these approaches are exemplary.

The multi-machine data store may include selected users (or non-users) linked to only specific ATM error signals (e.g., receipt jam signals). Alternatively, the multi-machine data file may include selected users (or non-users) linked to a combination of ATM error signals (e.g., receipt jam signals, card reader errors, key pad errors, machine tilt, etc.). An error association routine may be continuously executed by an ATM or other connected computer. Furthermore, different ATMs may operate an error association routine using a respectively different predetermined number of selected users. For example, one ATM may store data on only two users while another ATM may store data on fifty users. The number of users stored in an error association routine at a particular ATM may be chosen based on the number of prior vandalism events associated with that particular ATM.

Computers in ATM(s) or other connected computers may operate in accordance with programmed instructions to analyze error conditions potentially caused by tampering such as vandalism. This may include analyzing data stored in one or more data stores concerning users conducting transactions at the time a problem is detected. Alternatively or in addition, the computers may operate to analyze data related to users conducting transactions at the machine prior to the tampering being detected. Thus for example, the computer analysis may identify a prior user who may have tampered with the machine or who may have information regarding circumstances that may have a bearing on the cause of machine tampering or malfunction. Alternatively or in addition, the analysis may include data corresponding to persons adjacent to ATM(s) at or prior to the time of sensing a malfunction, but who may not have conducted a transaction. This may include for example, analyzing image data or other data that may be useful in identifying individuals. Such analysis may be useful in identifying persons responsible for machine tampering, particularly in cases where the stored data analyzed is related to a plurality of machines.

The exemplary embodiments can provide a simple yet highly reliable transport and retrieval apparatus for receipts and other sheets delivered by an automated banking machine. Such embodiments can also permit an automated banking machine to be highly compact because of the gate member and the ability of the apparatus to store numerous retrieved sheets in a stacked relation in a confined area. Such embodiments can also enable ready removal of the retrieved sheets as well as superior access for servicing the components thereof. It can also be self-adapting to various form and paper types. Such embodiments can also avoid unnecessary problem indications and identify individuals tampering with the machines.

Thus the new sheet transport and retrieval system of the exemplary embodiments achieves the above-stated objectives, eliminates difficulties encountered in the use of prior devices and systems, solves problems, and attains the desirable results described herein.

In the foregoing description certain terms have been used for brevity, clarity and understanding. However, no unnecessary limitations are to be implied therefrom because such terms are for descriptive purposes and are intended to be broadly construed. Moreover, the descriptions and illustrations herein are by way of examples and the invention in not limited to the details shown or described.

In the following claims any feature described as a means for performing a function shall be construed as encompassing any means known to those skilled in the art to be capable of performing the recited function, and shall not be deemed limited to the means shown or described herein for performing the recited function or mere equivalents thereof.

Having described the features, discoveries and principles of the invention, the manner in which it is constructed and operated and the advantages and useful results attained; the new and useful structures, devices, elements, arrangements, parts, combinations, systems, equipment, operations, methods and relationships are set forth in the appended claims.

We claim:

1. A method of operating an automated banking machine adapted to dispense cash and to provide receipts for transactions conducted with the machine, comprising:

(a) sending through operation of the machine, a first receipt in a receipt path toward a receipt outlet of the machine;

(b) determining through operation of the machine, failure to deliver the first receipt from the machine through the receipt path, including determining that the first receipt is in a jammed condition in the receipt path, wherein the first receipt is associated with a transaction conducted through operation of the machine;

(c) prior to generation of a machine malfunction signal indicating receipt delivery failure and while the first receipt remains in the machine, sending through operation of the machine a second receipt in the receipt path toward the receipt outlet, wherein the second receipt sequentially immediately follows the first receipt in the receipt path;

(d) determining through operation of the machine whether the first receipt becomes freed from the jammed condition in the receipt path in response to the sending in (c) of the second receipt; and (e) operating at least one computer of the machine to cause the machine malfunction signal to be generated responsive at least in part to the occurrence of (b) and a negative determination in (d) that the first receipt became freed.

2. The method according to claim 1 wherein (e) includes generating a receipt jam signal.

3. The method according to claim 1 and further comprising:

prior to (a), printing the first receipt with a printer in the machine.

4. The method according to claim 3 and further comprising:

prior to (c), printing the second receipt with the printer.

5. The method according to claim 1 and further comprising:

responsive at least in part to (b), storing in a data store user identifying data associated with the first receipt failure.

6. The method according to claim 1 and further comprising:

(f) storing in a data store, data corresponding to an image of (g) associating in the data store, the image with the first receipt failure.

7. The method according to claim 1 wherein the machine malfunction signal includes a receipt jam signal, and further comprising:

(f) prior to (a), storing in a data store user identifying data associated with at least one earlier user conducting a transaction with the machine prior to the transaction; and (g) analyzing user identifying data from the data store to identify prior users of the machine associated with transactions associated with respective receipt jam signals, and transactions prior to receipt jam signals, for purposes of identifying who may have tampered with the machine.

8. The method according to claim 1 wherein the second receipt comprises a dummy receipt, wherein (c) includes sending a dummy receipt in the receipt path.

9. The method according to claim 8 and further comprising:

(f) prior to (a), storing the dummy receipt in the machine.

10. The method according to claim 1 wherein at least one of the first receipt and the second receipt comprises a dummy receipt, wherein at least one of (a) and (c) includes sending a dummy receipt in the receipt path.

11. A method of operating an automated banking machine adapted to dispense cash and to provide receipts for transactions conducted with the machine, comprising:

(a) sending through operation of the machine, a first receipt in a receipt path toward a receipt outlet of the machine;

(b) determining through operation of the machine that the first receipt is in a jammed condition in the receipt path;

(c) prior to generation of a signal indicative of a machine malfunction and while the first receipt remains in the jammed condition in the receipt path, sending through operation of the machine a second receipt in the receipt path toward the receipt outlet, wherein the second receipt sequentially immediately follows the first receipt in the receipt path;

(d) determining through operation of the machine whether the first receipt becomes freed from the jammed condition in the receipt path in response to the sending of the second receipt in step (c); and (e) responsive at least in part to a negative determination in step (d), generating through operation of the machine the signal indicative of a machine malfunction.

12. The method according to claim 11 and further comprising:

(f) prior to (a), printing the first receipt through operation of the machine, including printing indicia corresponding to a particular transaction; and (g) subsequent to (f), printing the second receipt through operation of the machine.

13. The method according to claim 12 wherein the second receipt comprises a dummy receipt, wherein (g) includes printing a receipt not corresponding to a particular transaction.

14. The method according to claim 11 wherein the automated banking machine comprises an ATM, and performing steps (a)-(e) with the ATM.

15. The method according to claim 11 and further comprising:

(f) prior to (a), printing indicia corresponding to a transaction carried out through operation of the machine, on the first receipt.

16. The method according to claim 15 wherein the machine includes a cash dispenser, and further comprising (g) dispensing an amount of cash;

wherein (f) includes printing indicia associated with the amount of cash dispensed in (g) on the first receipt.

17. The method according to claim 11 wherein the second receipt comprises a dummy receipt, and further comprising:

prior to step (a), storing the dummy receipt in the machine.

18. A method of operating an automated banking machine adapted to dispense cash and to provide receipts for transactions conducted at the machine, wherein the machine includes a receipt outlet accessible to a user of the machine, comprising:

(a) printing a first receipt through operation of a printing device in the machine, (b) sending through operation of the machine, the first receipt in a receipt path toward the receipt outlet, (c) subsequent to (b), determining through operation of the machine that the first receipt is in a jammed condition in the receipt path, (d) subsequent to (c), printing a second receipt through operation of the printing device, (e) while the first receipt remains in the jammed condition in the receipt path and prior to generation of a receipt jam signal involving the machine, sending through operation of the machine the second receipt in the receipt path toward the receipt outlet, wherein the second receipt sequentially immediately follows the first receipt in the receipt path, (f) subsequent to (e), determining through operation of the machine whether the first receipt becomes freed from the jammed condition in the receipt path in response to the sending of the second receipt, and (g) generating the receipt jam signal responsive at least in part to a negative determination in (f) that the first receipt became freed.

19. At least one article comprising computer readable media including computer executable instructions operative to cause at least one computer of an automated banking machine including a cash dispenser to carry out a method comprising:

(a) sending a first receipt in a receipt path toward a receipt outlet of the machine;

(b) determining that the first receipt is in a jammed condition in the receipt path;

(c) prior to generation of a signal indicative of a machine malfunction and while the first receipt remains in the jammed condition in the receipt path, sending a second receipt in the receipt path toward the receipt outlet, wherein the second receipt sequentially immediately follows the first receipt in the receipt path;

(d) determining whether the first receipt becomes freed from the jammed condition in the receipt path in response to the sending of the second receipt in (c); and (e) responsive at least in part to a negative determination in (d), generating the signal indicative of a machine malfunction.

20. The at least one article according to claim 19, wherein the method further includes prior to (a), printing the first receipt through operation of a printer in the machine.

* * * * *